(12) United States Patent
Nakamura et al.

(10) Patent No.: US 9,516,133 B2
(45) Date of Patent: Dec. 6, 2016

(54) INFORMATION PROCESSING DEVICE, INFORMATION PROCESSING METHOD AND INFORMATION PROCESSING PROGRAM

(75) Inventors: Kentaro Nakamura, Kanagawa (JP); Toru Sasaki, Tokyo (JP); Akira Tange, Tokyo (JP); Masafumi Matsuda, Tokyo (JP); Kumiko Tokuhara, Tokyo (JP); Yongjin Jung, Kanagawa (JP); Masaki Kasahara, Tokyo (JP)

(73) Assignee: Sony Corporation, Tokyo (JP)

( * ) Notice: Subject to any disclaimer, the term of this patent is extended or adjusted under 35 U.S.C. 154(b) by 873 days.

(21) Appl. No.: 12/121,074

(22) Filed: May 15, 2008

(65) Prior Publication Data

US 2008/0291197 A1    Nov. 27, 2008

(30) Foreign Application Priority Data

May 24, 2007    (JP) .................................. 2007-138305

(51) Int. Cl.
*G06T 11/60* (2006.01)
*H04L 29/08* (2006.01)
*H04W 4/02* (2009.01)

(52) U.S. Cl.
CPC ............ *H04L 67/306* (2013.01); *H04L 67/18* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 6,549,781 B1 * | 4/2003 | O'Byrne | H04W 16/18 455/423 |
| 6,754,470 B2 * | 6/2004 | Hendrickson et al. | 455/67.11 |
| 7,024,466 B2 * | 4/2006 | Outten et al. | 709/219 |
| 7,124,125 B2 * | 10/2006 | Cook et al. | |
| 7,444,353 B1 * | 10/2008 | Chen et al. | |
| 7,496,960 B1 * | 2/2009 | Chen et al. | 726/22 |
| 7,505,674 B2 * | 3/2009 | Mikawa | 386/248 |
| 7,730,414 B2 * | 6/2010 | Najdenovski | 715/765 |
| 7,769,745 B2 * | 8/2010 | Naaman et al. | 707/713 |
| 2001/0053945 A1 * | 12/2001 | Hayashi et al. | 700/94 |
| 2002/0054141 A1 * | 5/2002 | Yen et al. | 345/804 |
| 2002/0120395 A1 * | 8/2002 | Smith | 701/208 |
| 2003/0184594 A1 * | 10/2003 | Ellenby | G01C 21/20 715/810 |
| 2003/0200157 A1 * | 10/2003 | Krajec | 705/28 |
| 2003/0220981 A1 * | 11/2003 | Nakamura et al. | 709/217 |
| 2003/0236695 A1 * | 12/2003 | Litwin, Jr. | 705/10 |
| 2005/0108319 A1 * | 5/2005 | Kohno et al. | 709/201 |
| 2006/0026030 A1 * | 2/2006 | Jacobs | 705/1 |

(Continued)

FOREIGN PATENT DOCUMENTS

| | | |
|---|---|---|
| JP | 2001-229329 | 8/2001 |
| JP | 2001-256151 | 9/2001 |

(Continued)

OTHER PUBLICATIONS

Office Action issued Oct. 18, 2011, in Japanese Patent Application No. 2007-138305.

(Continued)

*Primary Examiner* — Andrew G Yang
(74) *Attorney, Agent, or Firm* — Oblon, McClelland, Maier & Neustadt, L.L.P.

(57) ABSTRACT

An information processing device includes: a control section that displays, in response to an operation of an operation section, a piece of map information on a display section and acquires, in accordance with the piece of map information displayed on the display section, a list of content related to the piece of map information.

26 Claims, 25 Drawing Sheets

(56) References Cited

U.S. PATENT DOCUMENTS

| | | |
|---|---|---|
| 2006/0167864 A1* | 7/2006 | Bailey et al. .................. 707/3 |
| 2006/0277098 A1* | 12/2006 | Chung et al. .................. 705/14 |
| 2007/0064018 A1* | 3/2007 | Shoemaker ........ G06F 3/0481 345/660 |
| 2007/0150840 A1* | 6/2007 | Olcott ............ G06F 17/30899 715/854 |
| 2007/0164845 A1* | 7/2007 | Ivins et al. .................... 340/3.9 |
| 2007/0271255 A1* | 11/2007 | Pappo ............ G06F 17/30864 |
| 2007/0271297 A1* | 11/2007 | Jaffe et al. .................. 707/104.1 |
| 2007/0276870 A1* | 11/2007 | Rosenberg .................. 707/104.1 |
| 2008/0033903 A1* | 2/2008 | Carol et al. ...................... 707/1 |
| 2008/0064351 A1* | 3/2008 | Landschaft et al. ....... 455/187.1 |
| 2009/0177381 A1* | 7/2009 | Taniguchi .......... G01C 21/3679 701/454 |

FOREIGN PATENT DOCUMENTS

| | | | | |
|---|---|---|---|---|
| JP | 2002-203026 | | 7/2002 | |
| JP | 2003-14468 | | 1/2003 | |
| JP | 2004-021159 A | * | 1/2004 | |
| JP | 2005-31038 | | 2/2005 | |
| JP | 2006-266807 | | 10/2006 | |
| NL | 1029724 C1 | * | 10/2005 | ............ G06F 17/30 |
| WO | WO2006077512 | * | 7/2006 | ............ G06F 17/30 |

OTHER PUBLICATIONS

Office Action issued Jun. 19, 2012 in Japanese Application No. 2007-138305.

* cited by examiner

Tb / RANKING

| NATION | REGION | 1ST MUSIC | DL | 2ND MUSIC | DL | ... | 10TH MUSIC | DL |
|---|---|---|---|---|---|---|---|---|
| JAPAN | JAPAN | GOOD BYE YAI | 8371 | JYUNZENTAIKA SHOHOKUNOKAZE | 7856 | ... | BEAUTY BUNNY GOUDAGUMI | 5264 |
| | TOKYO | GOOD BYE YAI | 893 | FAST LOVE UDADAHIKARU | 794 | ... | BOTAYUKI ROMIOTOMERON | 645 |
| | KANAGAWA | JYUNZENTAIKA SHOHOKUNOKAZE | 710 | BEAUTY BUNNY GOUDAGUMI | 654 | ... | ENDLESS STORE SATO YUNA | 601 |
| | SAITAMA | SAKURA GOFUKURO | 546 | WINE ROAD AYAKA×GOKURO | 497 | ... | JUMBOPAN MERONKINENBI | 451 |
| | ... | ... | | ... | | ... | ... | |
| | OKINAWA | | | | | ... | | |
| U.S.A. | U.S.A. | ABRADAABRADI BEATBANS | 25778 | SURIDA! DON MICHAEL | 24612 | ... | GOMENNASAI IREZUMI | 21567 |
| | NEY YORK | SURIDA! DON MICHAEL | 1468 | WORLD TOP CAR PAINTERS | 1349 | ... | ABRADAABRADI BEATBANS | 1068 |

FIG.4

| NATION | REGION | RANKING | | | | | | |
|---|---|---|---|---|---|---|---|---|
| | | 1ST | | 2ND | | ... | 10TH | |
| | | MUSIC | DL | MUSIC | DL | ... | MUSIC | DL |
| JAPAN | JAPAN | GOOD BYE YAI | 8371 | JYUNZENTAIKA SHOHOKUNOKAZE | 7856 | ... | BEAUTY BUNNY GOUDAGUMI | 5264 |
| | TOKYO | GOOD BYE YAI | 893 | FAST LOVE UDADAHIKARU | 794 | ... | BOTAYUKI ROMIOTOMERON | 645 |
| | KANAGAWA | JYUNZENTAIKA SHOHOKUNOKAZE | 710 | BEAUTY BUNNY GOUDAGUMI | 654 | ... | ENDLESS STORE SATO YUNA | 601 |
| | SAITAMA | SAKURA GOFUKURO | 546 | WINE ROAD AYAKA×GOKURO | 497 | ... | JUMBOPAN MERONKINENBI | 451 |
| | ... | ... | ... | ... | ... | ... | ... | ... |
| | OKINAWA | ... | ... | ... | ... | ... | ... | ... |
| U.S.A. | U.S.A. | ABRADAABRADI BEATBANS | 25778 | SURIDA! DON MICHAEL | 24612 | ... | GOMENNASAI IREZUMI | 21567 |
| | NEY YORK | SURIDA! DON MICHAEL | 1468 | WORLD TOP CAR PAINTERS | 1349 | ... | ABRADAABRADI BEATBANS | 1068 |

Tb ← RETRIEVING

FIG.5

INFORMATION PROCESSING DEVICE, INFORMATION PROCESSING METHOD AND INFORMATION PROCESSING PROGRAM

CROSS REFERENCES TO RELATED APPLICATIONS

The present invention contains subject matter related to Japanese Patent Application JP2007-138305 filed in the Japanese Patent Office on May 24, 2007, the entire contents of which being incorporated herein by reference.

BACKGROUND OF THE INVENTION

Field of the Invention

The present invention relates to an information processing device, information processing method and information processing program, and is preferably applied to an information processing device that manages information related to content, for example.

Description of the Related Art

A content playback device for playing back pieces of content data has become popular, such as: a personal computer that plays back pieces of music data from a hard disk; and a portable audio player that records pieces of music data transferred from the personal computer on a flash memory and plays back them. The content playback device also includes a cell phone, a gaming machine, a vehicle navigation device and the like.

Such content playback devices are designed to play back a piece of music data that is associated with a piece of music identification information specified by a user. The piece of music identification information specified by the user may be a music title, an artist name or the like.

There is also a content playback device that plays back the pieces of music data by using various kinds of information associated with the pieces of music data, without using the pieces of music identification information. For example, as disclosed in Jpn. Pat. Laid-open Publication No. 2003-14468, there is a vehicle navigation device (i.e. a car navigation device) that contains the pieces of music data, each of which is associated with a different region of map information; and, when a vehicle (i.e. a car) is running in a certain region, the device plays back a piece of music data associated with the region.

SUMMARY OF THE INVENTION

However, if he/she wants to play back the piece of music data, the user has to drive a vehicle to the corresponding region. Then, the above vehicle navigation device reads out (or acquires) the piece of music data from a storage section to play back. In this manner, the vehicle navigation device has difficulties in providing users with the pieces of music data associated with regions.

The present invention has been made in view of the above points and is intended to provide an information processing device, information processing method and information processing program that can more easily provide a user with a piece of content associated with a region.

In one aspect of the present invention, an information processing device includes a control section that displays, in response to an operation of an operation section, a piece of map information on a display section and acquires, in accordance with the piece of map information displayed on the display section, a list of content related to the piece of map information.

Accordingly, a user just performs an operation to display a piece of map information and then the device acquires a list of content associated with the displayed piece of map information.

As described above, an information processing device includes a control section that displays, in response to an operation of an operation section, a piece of map information on a display section and acquires, in accordance with the piece of map information displayed on the display section, a list of content related to the piece of map information. Accordingly, a user just performs an operation to display a piece of map information and then the device acquires a list of content associated with the displayed piece of map information. Therefore, the device can more easily provide a user with a piece of content associated with a region without forcing the user to go there.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 4 is a schematic diagram illustrating the configuration of a popular music ranking table;

FIG. 5 is a schematic diagram illustrating how to extract a specified region's popular music ranking list;

DETAILED DESCRIPTION OF PREFERRED EMBODIMENTS

An embodiment of the present invention will be described in detail with reference to the accompanying drawings.

(1) First Embodiment (1-1) Overview of First Embodiment

The following is an overview of a first embodiment. After that, a specific example of the first embodiment will be described.

Figure 1:
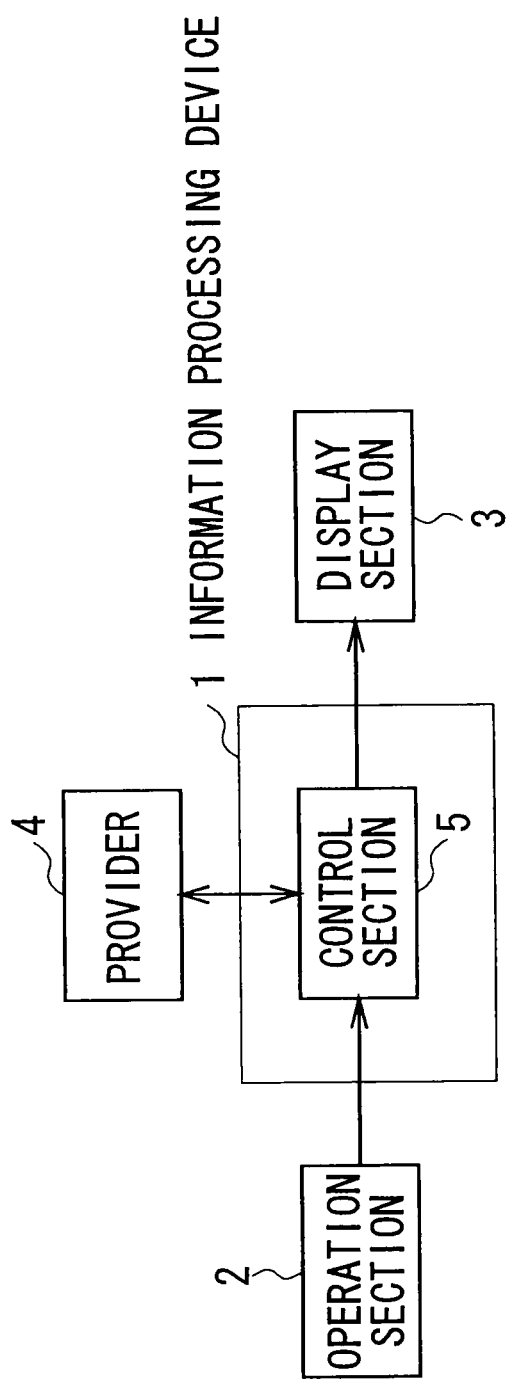
FIG. 1 is a block diagram illustrating the functional configuration of an information processing device according to a first embodiment of the present invention.

In FIG. 1, the reference numeral 1 denotes a functional block of an information processing device. The information processing device 1 includes a control section 5. The control section 5 displays a piece of map information on a display section 3 when an operation section 2 accepts an operation. Based on the piece of map information displayed on the display section 3, the control section 5 acquires from a predetermined provider 4 a list of content associated with the piece of map information.

In this manner, a user just operates the operation section 2 to display the piece of map information, and then the information processing device 1 acquires the list of content associated with the region indicated by the piece of map information displayed on the display section 3. Accordingly, in accordance with the acquired list, a user is easily provided with the pieces of content associated with the region without going to the region.

Figure 2:
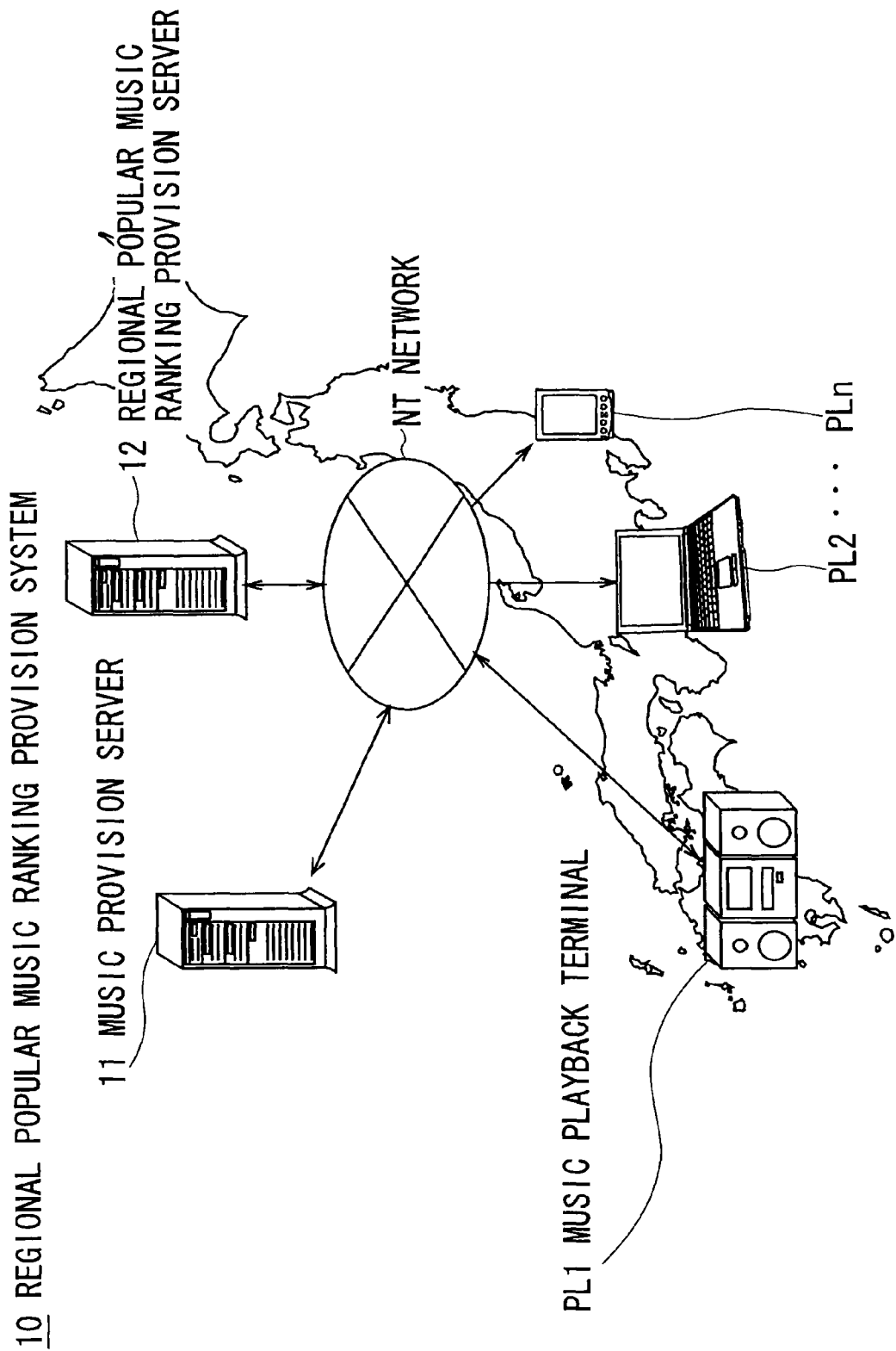
FIG. 2 is a schematic diagram illustrating the configuration of a regional popular music ranking provision system according to a first embodiment of the present invention.

(1-2) Specific Example of First Embodiment (1-2-1) Configuration of Regional Popular Music Ranking Provision System The following describes a specific example of the first embodiment. In FIG. 2, the reference numeral 10 denotes a regional popular music ranking provision system. The regional popular music ranking provision system 10 includes: a music provision server 11, which provides pieces of music data via a network NT; a regional popular music ranking provision server 12, which provides each region's ranking of the most popular music via the network NT; and a plurality of music playback terminals PL (PL1, PL2, . . . , and PLn), which contain the functions of downloading a piece of music data from the music provision server 11, playing back the piece of music data, downloading a popular music ranking table (described later) from the regional popular music ranking provision server 12, and displaying a popular music ranking of a specified area, by connecting to the music provision server 11 and the regional popular music ranking provision server 12 via the network NT. Each region's ranking of the most popular music is also referred to as "regional popular music ranking," and those regions for example include Japan, U.S.A, Tokyo, Kanagawa Prefecture and the like. The music playback terminals PL are the equivalent of the information processing device 1.

In this case, the regions could be certain points or certain areas on the map.

When a user operates and instructs the music playback terminal PL to download a piece of music data from the music provision server 11, the music playback terminal PL transmits a piece of music identification information of the piece of music data (i.e. its music title or artist name) to the music provision server 11. The music playback terminal PL therefore receives the piece of music data from the music provision server 11 and stores it in a storage section. This series of processes is also known as "download."

Figure 3:
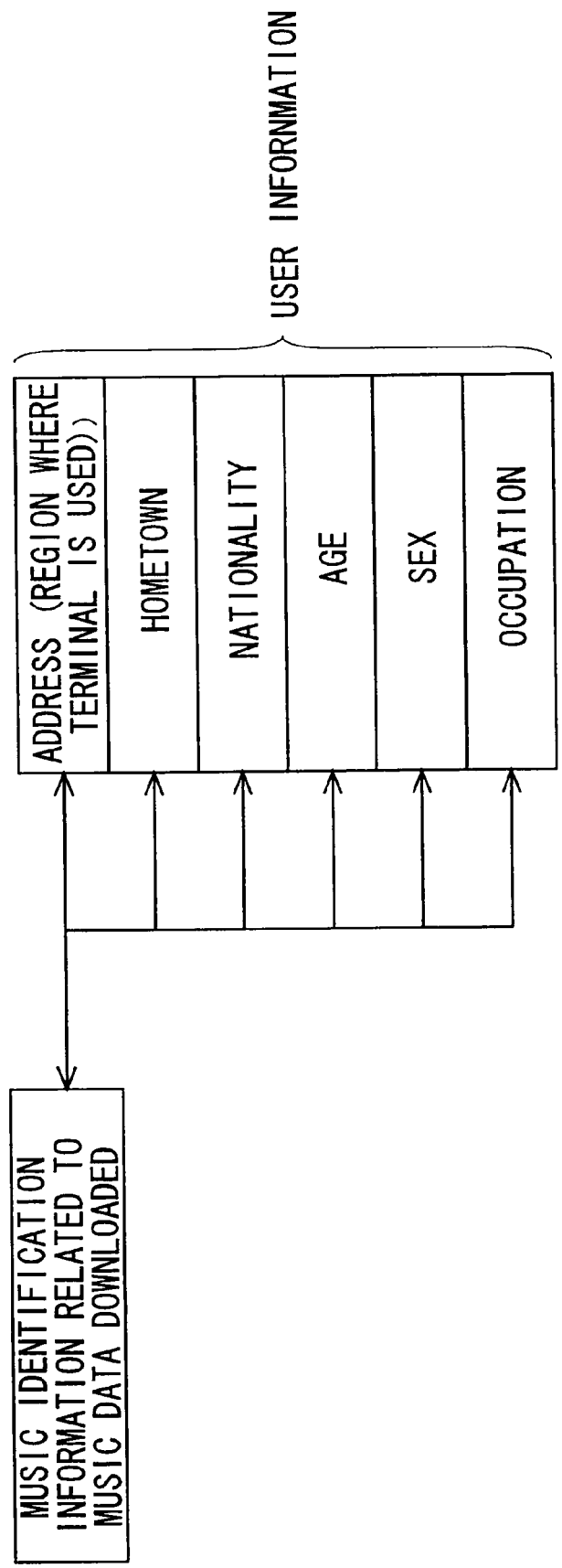
FIG. 3 is a schematic diagram illustrating the contents of a piece of download history information.

At this time, the music playback terminal PL transmits or uploads a piece of download history information to the regional popular music ranking provision server 12; the piece of download history information includes, as shown in FIG. 3, the piece of music identification information corresponding to the piece of music data downloaded and a piece of user information registered by a user of the music playback terminal PL; and the piece of user information for example contains a user's postal address (which indicates a region to which the piece of music data has been downloaded (also referred to as "downloading region")), a user's hometown, a user's nationality, a user's age, a user's sex and a user's occupation.

The regional popular music ranking provision server 12 receives from the music playback terminal PL both the piece of music identification information and the piece of user information as the piece of download history information, and then stores them in the storage section such that they are associated with one another. Based on the received pieces of music identification information and pieces of user information, the regional popular music ranking provision server 12 produces a popular music ranking table Tb; the popular music ranking table Tb is a popular music ranking of each region (Japan, U.S.A, Tokyo, Kanagawa Prefecture or the like), as shown in FIG. 4.

The popular music ranking table Tb lists: downloading regions (such as nations' names and each nation's regional names (including its nation name)); and each region's popular music ranking. Each popular music ranking contains: the pieces of music identification information of the most downloaded music data (in this case, those ranked first to tenth in terms of the number of downloading); and the number of downloading.

After receiving from the music playback terminals PL the pieces of user information and pieces of music identification information as the download history information, the regional popular music ranking provision server 12 recognizes downloading regions from addresses described in the pieces of user information and then sorts out the pieces of music identification information by region. The regional popular music ranking provision server 12 also counts the number of downloading for each piece of music data (or each piece of music identification information). The regional popular music ranking provision server 12 then chooses the most downloaded pieces of music data, such as those ranked first to tenth in terms of the number of downloading, to generate the popular music ranking table Tb.

FIG. 3 illustrates the popular music ranking table Tb. In the ranking of the region "Japan (the nation's name)" of the country "Japan", the piece of music whose title/artist name are "Good Bye/YAI" is ranked first and its number of downloading is "8371"; the piece of music whose title/artist name are "Jyunzentaika/Shohokunokaze" is ranked second and its number of downloading is "7856"; the piece of music whose title/artist name are "Beauty Bunny/Goudagumi" is ranked tenth and its number of downloading is "5264." In the ranking of the region "Tokyo (the prefecture's name)" of the country "Japan", the piece of music whose title/artist name are "Good Bye/YAI" is ranked first and its number of downloading is "893"; the piece of music whose title/artist name are "Fast Love/Udadahikaru" is ranked second and its number of downloading is "794"; the piece of music whose title/artist name are "Botayuki/Romiotomeron" is ranked tenth and its number of downloading is "645." In the ranking of the region "U.S.A (the nation's name)" of the country "U.S.A", the piece of music whose title/artist name are "Abradaabradi/Beatbans" is ranked first and its number of downloading is "25778"; the piece of music whose title/artist name are "Surida!/Don Michael" is ranked second and its number of downloading is "24612"; and the piece of music whose title/artist name are "GOMENNASAI/Irezumi" is ranked tenth and its number of downloading is "21567."

When accepting an acquisition request of the popular music ranking table Tb from the music playback terminal PL (i.e. when the music playback terminal PL requests the acquisition of the popular music ranking table Tb), the regional popular music ranking provision server 12 transmits the popular music ranking table Tb to the music playback terminal PL.

After receiving from the regional popular music ranking provision server 12 the popular music ranking table Tb, the music playback terminal PL retrieves, as shown in FIG. 5, a popular music ranking list (or a list of 1st to 10th music titles) of the specified region ("Japan", for example) from the popular music ranking table Tb and displays it on a display section. Therefore, a user can confirm the titles of popular music in the specified region.

In that manner, a user just instructs the music playback terminal PL to display a certain region, and then the music playback terminal PL displays the region as well as recognizing it as a region specified by the user. The music playback terminal PL therefore retrieves the specified region's popular music ranking list from the popular music ranking table Tb acquired from the regional popular music ranking provision server 12.

Figure 6:
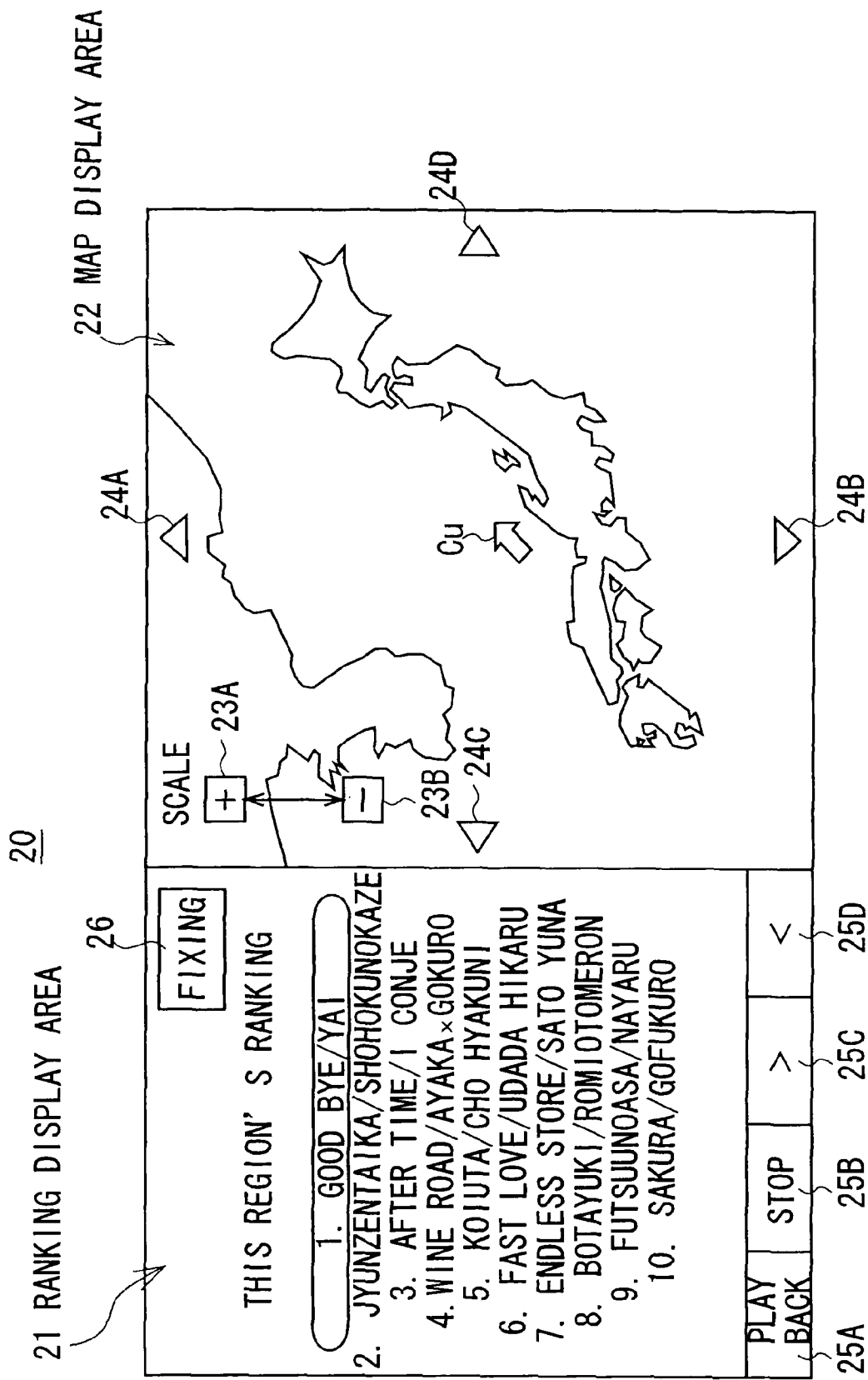
FIG. 6 is a schematic diagram illustrating the configuration of a regional popular music ranking screen (1)

More specifically, as shown in FIG. 6, the music playback terminal PL displays on a display section an application screen (also referred to as "regional popular music ranking screen") 20 containing a piece of map information of a certain region and a popular music ranking list of a specified region. The regional popular music ranking screen 20 has two areas on the right and left sides. At the left side is a ranking display area 21 where a popular music ranking list is displayed. At the right side is a map display area 22 where a piece of map information is displayed.

The map display area 22 includes: scale changing buttons 23 for changing the scale of the map displayed (a zoom-in button 23A and a zoom-out button 23B); and region shifting buttons 24 for shifting the area displayed on a certain scale as a piece of map information MP to an adjacent region (an upward shifting button 24A, a downward shifting button 24B, a left shifting button 24C and a right shifting button 24D). By moving a cursor Cu on the map display area 22 and clicking the scale changing buttons 23 and the region shifting buttons 24, a piece of map information of an arbitrary region is displayed on an arbitrary scale.

Each time when the scale changing buttons 23 and the region shifting buttons 24 are controlled to display an arbitrary region's map on an arbitrary scale, the music playback terminal PL recognizes the region displayed on the map display area 22 as a specified region and retrieves the specified region's popular music ranking list from the popular music ranking table Tb.

The music playback terminal PL displays the retrieved popular music ranking list on the ranking display area 21 after processing it (for example, after removing the number-of-downloading parts) or without processing it. In this manner, the music playback terminal PL provides a user with a popular music ranking list of the region (or the piece of map information) displayed on the map display area 22.

When a user chooses, by controlling the cursor Cu, a specific region (Tokyo, for example) from the region (Japan, for example) displayed on the map display area 22, the music playback terminal PL recognizes it as a specified region and then retrieves the specified region's popular music ranking list from the popular music ranking table Tb to display it on the ranking display area 21.

The music playback terminal PL subsequently regards the popular music ranking list displayed on the ranking display area 21 as a play list and sequentially transmits the pieces of music identification information described in the popular music ranking list to the music provision server. Therefore, the music playback terminal PL sequentially receives the pieces of music data corresponding to the pieces of music identification information and then plays back them (i.e. streaming playback). Accordingly, a user can listen to the pieces of popular music in the region that he/she has specified to display on the map display area 22 as a piece of map information.

Moreover, on the popular music ranking list displayed on the ranking display area 21, the music playback terminal PL highlights the piece of music identification information of the piece of music data the terminal PL is playing back. This allows a user to recognize which piece of music data is currently played back from the popular music ranking list.

In addition, the ranking display area 21 includes playback operation buttons 25 (a playback button 25A, a stop button 25B, a next music button 25C and a previous music button 25D) to control the playback of music data.

When the playback operation buttons 25 are operated by the cursor Cu, the music playback terminal PL regards the popular music ranking list displayed on the ranking display area 21 as a play list and then performs a playback control process for the currently-played piece of music data.

By the way, if the storage section of the music playback terminal PL already contains the piece of music data corresponding to the piece of music identification information listed in the popular music ranking list, the music playback terminal PL reads out it from the storage section to play back without acquiring it from the music provision server 11.

In addition, the ranking display area 21 includes a fixedly displaying button 26, which allows the same popular music ranking list to be displayed even after another region is selected by the scale changing buttons 23 and the region shifting buttons 24 and is displayed on the map display area 22. After the fixedly display button 26 is selected by the cursor Cu, the music playback terminal PL keeps displaying and using the same popular music ranking list to play back the same pieces of music data even when another region is selected by the scale changing buttons 23 and the region shifting buttons 24 and is displayed on the map display area 22, until the fixedly display button 26 is selected again.

As described above, in the regional popular music ranking provision system 10, the music playback terminal PL displays on a display section a piece of map information of the region specified by a user; and retrieves the specified region's popular music ranking list from the popular music ranking table Tb acquired from the regional popular music ranking provision server 12. Therefore, the regional popular music ranking provision system 10 can provide users with each region's popular music and songs without forcing the users to go there.

Figure 7:
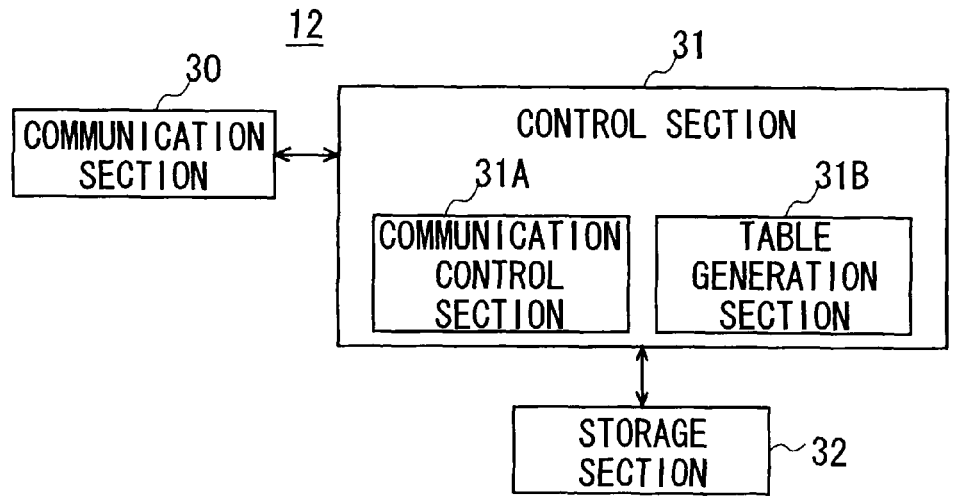
FIG. 7 is a block diagram illustrating the functional configuration of a regional popular music ranking provision server.

(1-2-2) Configuration of the Regional Popular Music Ranking Provision Server and the Music Playback Terminal The following describes main components of the above-noted regional popular music ranking provision system 10: the regional popular music ranking provision server 12 and the music playback terminal PL. As shown in FIG. 7, the regional popular music ranking provision server 12 includes: a communication section 30, which communicates with the music playback terminals PL via the network NT; a control section 31, which includes a communication control section 31A that controls the communication section 30 and a table generation section 31B that generates the popular music ranking table Tb; and a storage section 32, which stores the generated popular music ranking table Tb and the pieces of download history information uploaded by the music playback terminals PL.

After the communication section 30 under the control of the communication control section 31A receives the piece of download history information from the music playback terminal PL, the regional popular music ranking provision server 12 stores it in the storage section 32. The communication control section 31A performs this process each time the music playback terminal PL uploads the piece of download history information. As a result, the pieces of download history information uploaded from the music playback terminals PL accumulate in the storage section 32.

By using those pieces of download history information stored in the storage section 32, the table generation section 31B generates the popular music ranking table Tb at predetermined intervals (once a day, for example) and then saves it in the storage section 32. If there is the previously-generated popular music ranking table Tb in the storage section 32, it is replaced with a new one.

When the communication section 30 receives the acquisition request of the popular music ranking table Tb from the music playback terminal PL, the communication control section 31A reads out the popular music ranking table Tb from the storage section 32 and then transmits it to the music playback terminal PL by using the communication section 30.

In that manner, the regional popular music ranking provision server 12 provides the music playback terminals PL with the popular music ranking table Tb containing the regions' popular music ranking lists.

Figure 8:
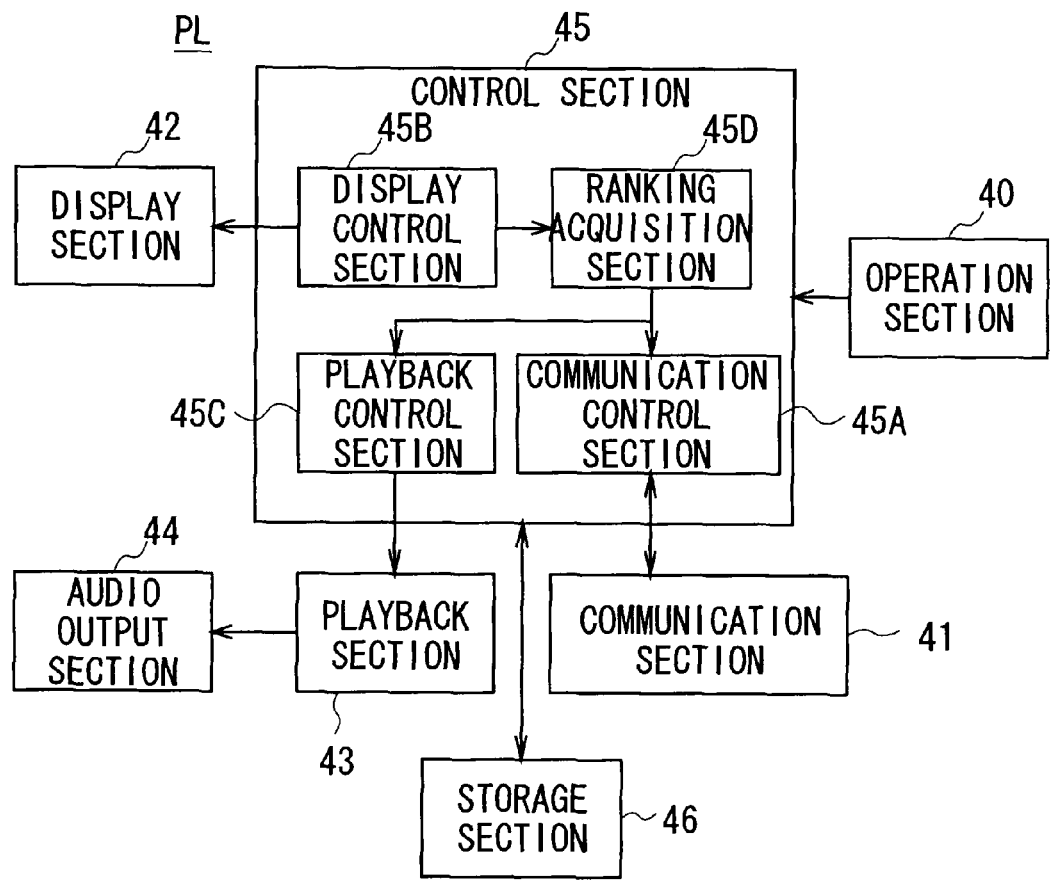
FIG. 8 is a block diagram illustrating the functional configuration of a music playback terminal.

As shown in FIG. 8, the music playback terminal PL includes an operation section 40, which accepts user's operational inputs; a communication section 41, which communicates with the regional popular music ranking provision server 12 via the network NT; a display section 42, which displays the regional popular music ranking screen 20; a playback section 43, which plays the pieces of music data; an audio output section 44, which outputs sound as a result of playback by the playback section 43; a control section 45, which contains a communication control section 45A that controls the communication section 40, a display control section 45B that controls the display section 42, a playback control section 45C that controls the playback section 43 and a ranking acquisition section 45D that retrieves a specified region's popular music ranking list from the popular music ranking table Tb; and a storage section 46 that stores the popular music ranking table Tb, the pieces of music data, the pieces of user information and the map information data.

When the music playback terminal PL is instructed through the operation section 40 to download a piece of music data from the music provision server 11, the communication section 41 under the control of the communication control section 45A transmits a piece of music identification information corresponding to the piece of music data to the music provision server 11. After that, the communication control section 45A receives, by using the communication section 41, the piece of music data from the music provision server 11 and then stores it in the storage section 46.

At this time, the communication control section 45A also transmits (or uploads), by using the communication section 41, to the regional popular music ranking provision server 12 the piece of music identification information corresponding to the piece of music data downloaded and the piece of user information stored in the storage section 46 collectively as a piece of download history information.

At a given time, the communication control section 45A controls the communication section 41 to transmit an acquisition request of the popular music ranking table Tb to the regional popular music ranking provision server 12. The communication control section 45A then receives, by using the communication section 41, the popular music ranking table Tb from the regional popular music ranking provision server 12 and then stores it in the storage section 46.

When a piece of map information of a certain region is specified by the operation section 40 to display it on the map display area 22 of the regional popular music ranking screen 20, the display control section 45B reads out the piece of map information data from the storage section 46 and then displays the piece of map information of the specified region on the display section 42 based on the piece of map information data.

At this time, the ranking acquisition section 45D recognizes the displayed region as a specified region and then retrieves the specified region's popular music ranking list from the popular music ranking table Tb stored in the storage section 46.

Subsequently, the display control section 45B displays the specified region's popular ranking list retrieved by the ranking acquisition section 45D on the display section 42 (i.e. on the ranking display area 21 of the regional popular music ranking screen 20).

At this time, the playback control section 45C regards the specified region's popular ranking list retrieved by the ranking acquisition section 45D as a play list and controls the playback section 43 to play back the pieces of music data corresponding to the pieces of music identification information listed in the popular music ranking list. If the storage section 46 already contains the piece of music data corresponding to the piece of music identification information listed in the popular music ranking list, the playback control section 45C reads out it from the storage section 46 and plays back it by using the playback section 43. Whereas if it doesn't, the communication control section 45A performs a process of acquiring the piece of music data from the music provision server 11, and the playback section 43 plays back the acquired piece of music data.

The playback section 43 plays back the pieces of music data by transmitting their audio signals to the audio output section 44, which then outputs sound based on the audio signals. At this time, the display control section 45B highlights the piece of music identification information of the piece of music data the terminal PL is playing back on the popular music ranking list displayed on the display section 42.

When a playback operation for a piece of music data is performed through the operation section 40, the playback control section 45C controls the playback section 43 to perform a playback control process of the piece of music data.

In that manner, when a user operates the operation section 40, the music playback terminal PL displays a piece of map information of an arbitrary region and its region's popular music ranking list on the display section 42. The music playback terminal PL also plays back the pieces of music data listed in the popular music ranking list.

(1-2-3) Operational Procedure for Displaying a Popular Music Ranking List of a Specified Region The following describes a specific example of an operational procedure for displaying a popular music ranking list of a region specified on the regional popular music ranking screen 20 displayed on the display section 42 of the music playback terminal PL.

Figure 9:
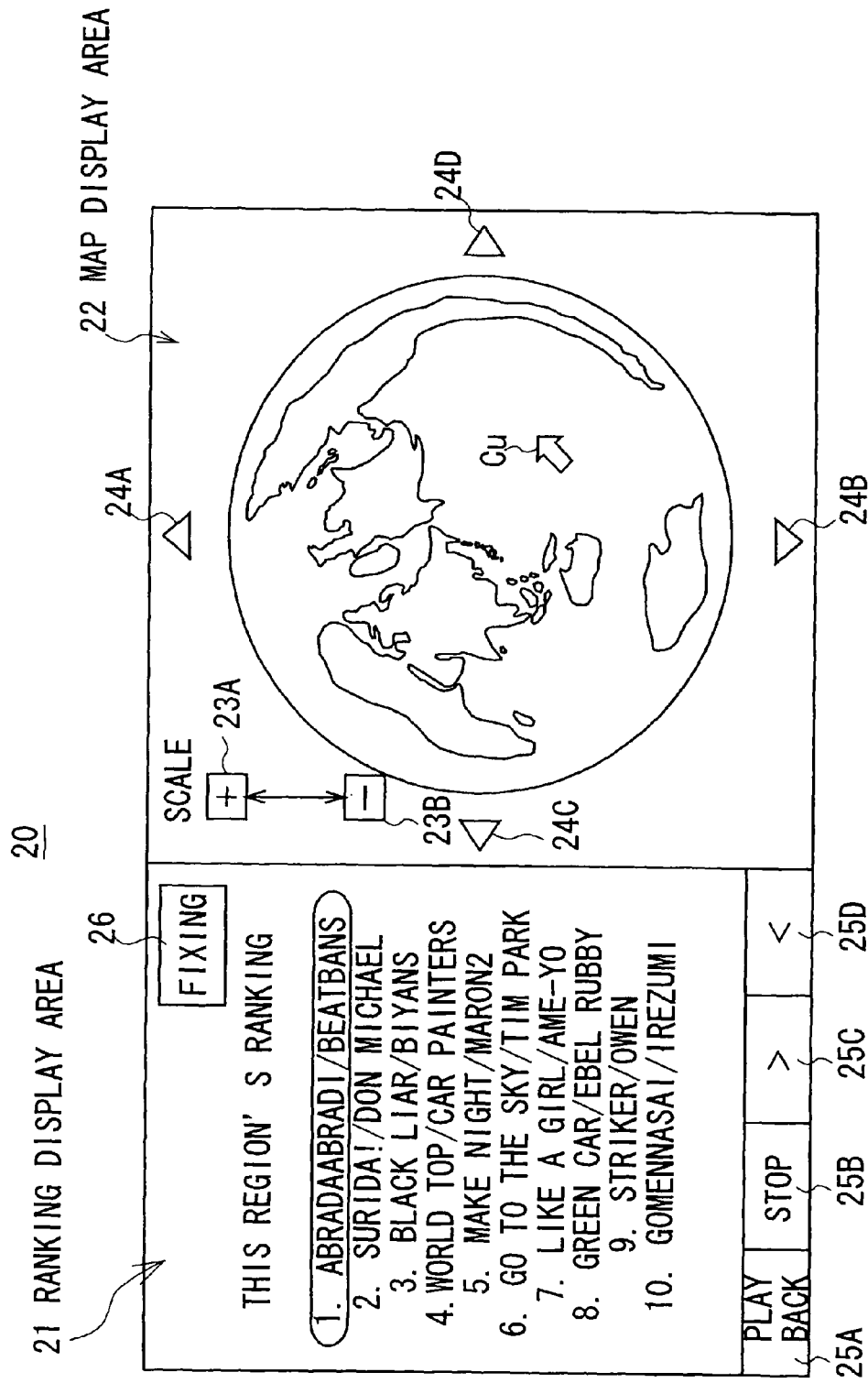
FIG. 9 is a schematic diagram illustrating the configuration of a regional popular music ranking screen (2)

For example, when being instructed by the operation section 40 to start an application program to display the regional popular music ranking screen 20, the display control section 45B of the music playback terminal PL first displays on the display section 42 the regional popular music ranking screen 20 where an entire global map is displayed on the map display area 22 as a piece of map information as shown in FIG. 9.

At this time, the ranking acquisition section 45D of the music playback terminal PL regards the entire world as a specified region and then retrieves the entire world's popular music ranking list from the popular music ranking table Tb. More specifically, the ranking acquisition section 45D for example regards the U.S.A.'s popular music ranking list as the entire world's one and retrieves it from the popular music ranking table Tb. The display control section 45B of the music playback terminal PL subsequently displays the U.S.A.'s popular music ranking list on the ranking display area 21 of the regional popular music ranking screen 20.

In this manner, immediately after the application program starts running, the piece of map information of the entire globe is displayed on the map display area 22 of the regional popular music ranking screen 20, and the entire world's popular music ranking list (or the U.S.A.'s popular music ranking list, in this embodiment) is displayed on the ranking display area 21.

In addition, the playback control section 45C of the music playback terminal PL starts playing back the pieces of music data based on the play list or the entire world's popular music ranking list displayed on the ranking display area 21.

When the map displayed is enlarged or reduced by the scale changing buttons 23 of the map display area 22 or is shifted to another region by the region shifting buttons 24 of the map display area 22 (also referred to as "scale-changing operation" and "region-shifting operation", respectively), the display control section 45C of the music playback terminal PL changes the piece of map information displayed on the map display area 22.

After the map display area 22 is completely updated (after a predetermined period of time has passed since the above-noted scale-changing or region-shifting operation was performed, for example), the ranking acquisition section 45D regards the region displayed on the map display area 22 as a specified region and then retrieves the specified region's popular music ranking list from the popular music ranking table Tb. By the way, the playback control section 45C keeps playing back the pieces of music data from the previous region's popular music ranking list (the entire world's one, in this case) until the map display area 22 is completely updated.

Figure 10:
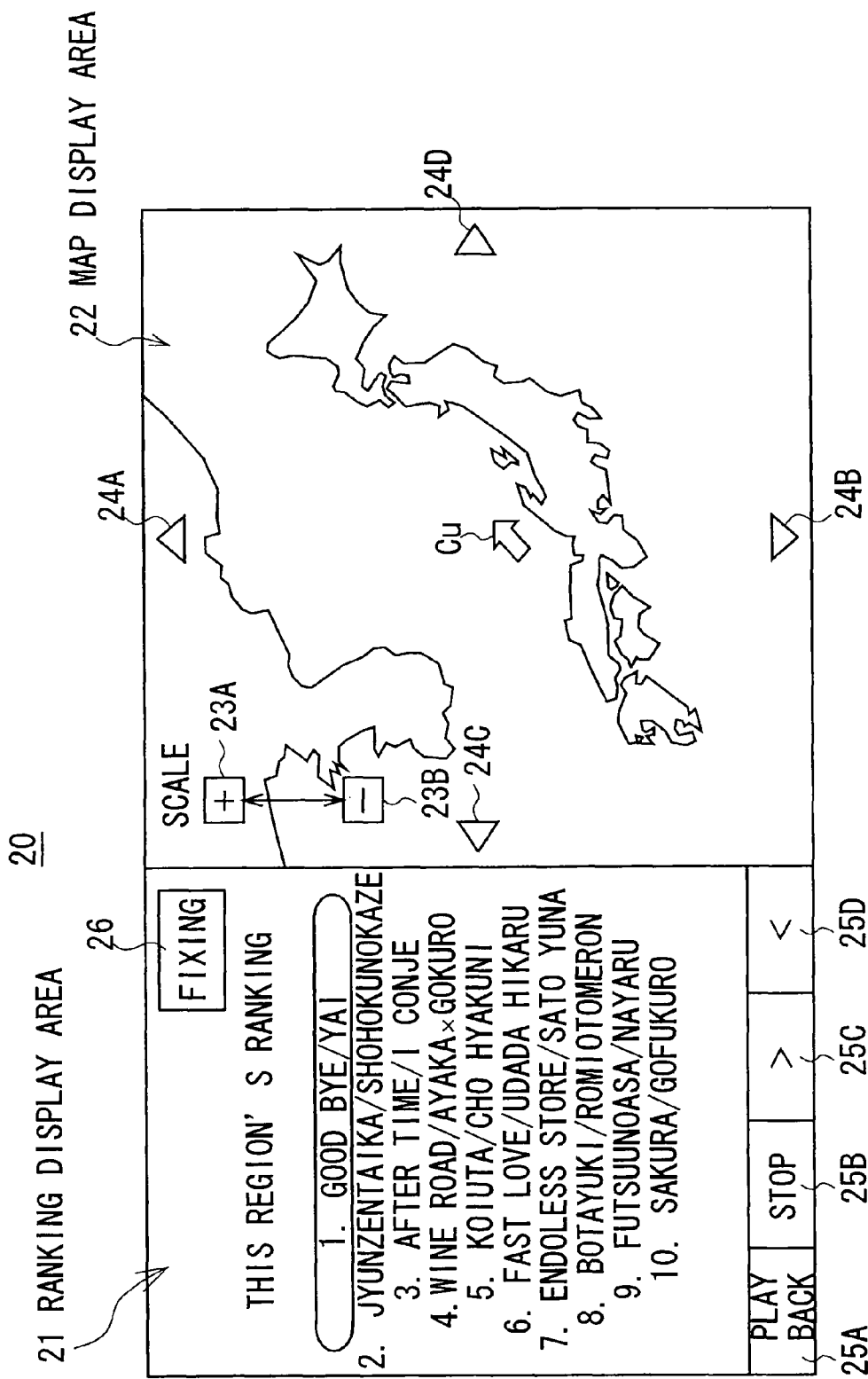
FIG. 10 is a schematic diagram illustrating the configuration of a regional popular music ranking screen (3)

For example, as shown in FIG. 10, if the map display area 22 displays Japan and adjacent countries (South Korea, North Korea and part of China, for example), the ranking acquisition section 45 recognizes from the scale of the map that each country should be recognized as one region.

Therefore, the ranking acquisition section 45D retrieves from the popular music ranking table Tb the popular music ranking lists of all the regions (or countries) displayed. In this case, the ranking acquisition section 45D retrieves the Japan's, South Korea's, North Korea's and China's popular music ranking lists (i.e. those of the four countries of East Asia).

The ranking acquisition section 45D counts the number of downloading for each piece of music data (or each piece of music identification information) listed in the four countries' popular music ranking lists and then lists the pieces of music identification information in order of the number of downloading. The ranking acquisition section 45D subsequently extracts the top ten pieces to generate a general popular music ranking list of the four countries.

The display control section 45B then removes the entire world's popular music ranking list and instead displays the four countries' general popular music ranking list on the ranking display area 21 of the regional popular music ranking screen 20.

In that manner, if the map display area 22 displays a plurality of regions at the same time, the ranking display area 21 displays a general popular music ranking list that combines the regions' popular music ranking lists.

The playback control section 45C regards the general popular music ranking list displayed on the ranking display area 21 as a play list and then starts playing back the pieces of music data in accordance with the play list.

Figure 11:
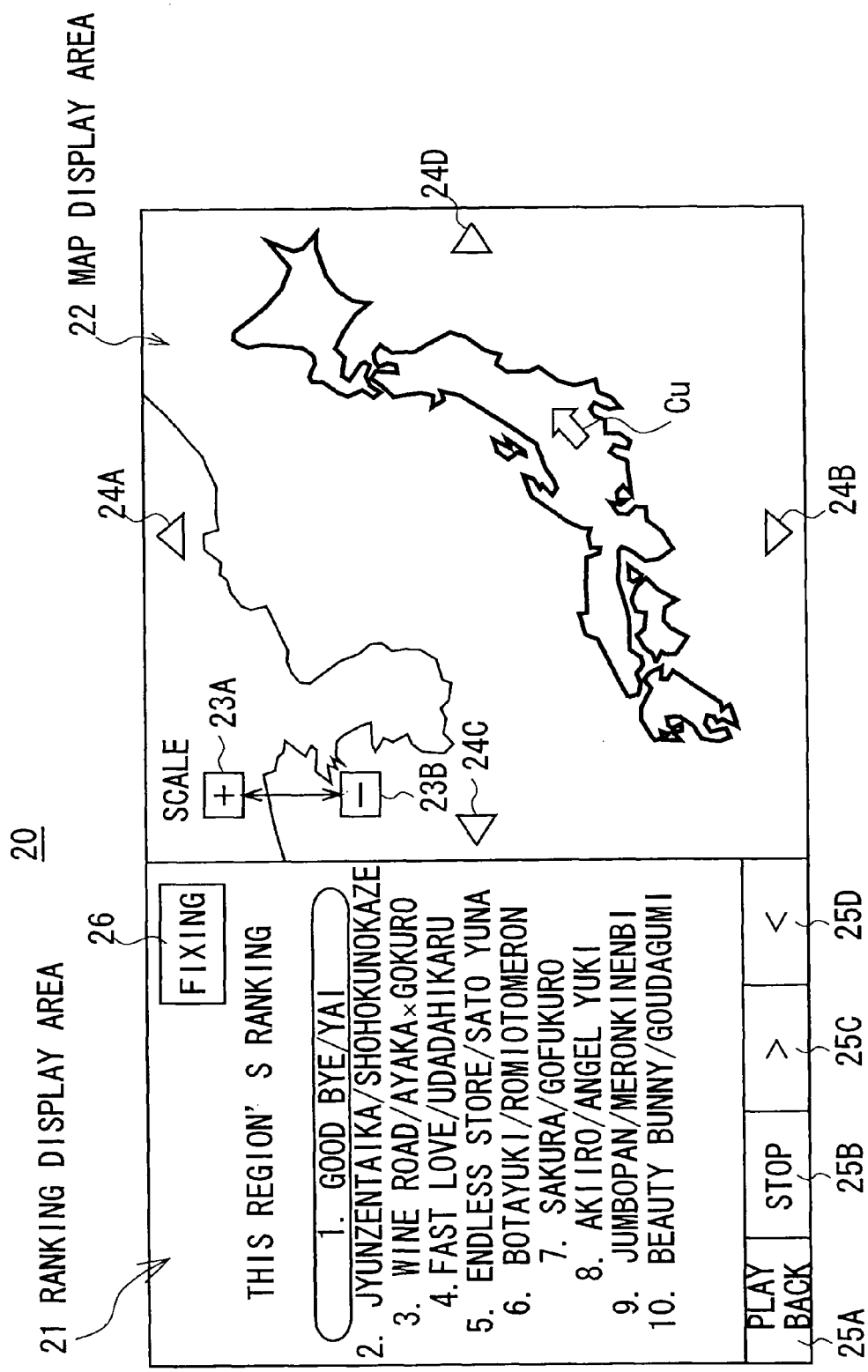
FIG. 11 is a schematic diagram illustrating the configuration of a regional popular music ranking screen (4)

After that, when a specific region (Japan, for example) is selected by the cursor Cu from among the regions displayed on the map display area 22, the display control section 45B highlights the selected region, as shown in FIG. 11.

At this time, the ranking acquisition section 45D determines that another region has been specified as a specified region replacing the previous one. The ranking acquisition section 45D therefore retrieves from the popular music ranking table Tb the popular music ranking list of the region specified by the cursor Cu (Japan, for example).

The display control section 45B of the music playback terminal PL displays the Japan's popular music ranking list on the ranking display area 21 of the regional popular music ranking screen 20.

In that manner, when a certain region is selected by the cursor Cu, the ranking display area 21 displays the popular music ranking list of the region specified by the cursor Cu.

At the same time, the playback control section 45C of the music playback terminal PL regards the Japan's popular music ranking list displayed on the ranking display area 21 as a play list and then starts playing the pieces of music data listed in the play list.

After that, when the map displayed is enlarged or reduced by the scale changing buttons 23 or is shifted to another region by the region shifting buttons 24 (also referred to as "scale-changing operation" and "region-shifting operation", respectively) the display control section 45B of the music playback terminal PL changes the piece of map information displayed on the map display area 22.

Figure 12:
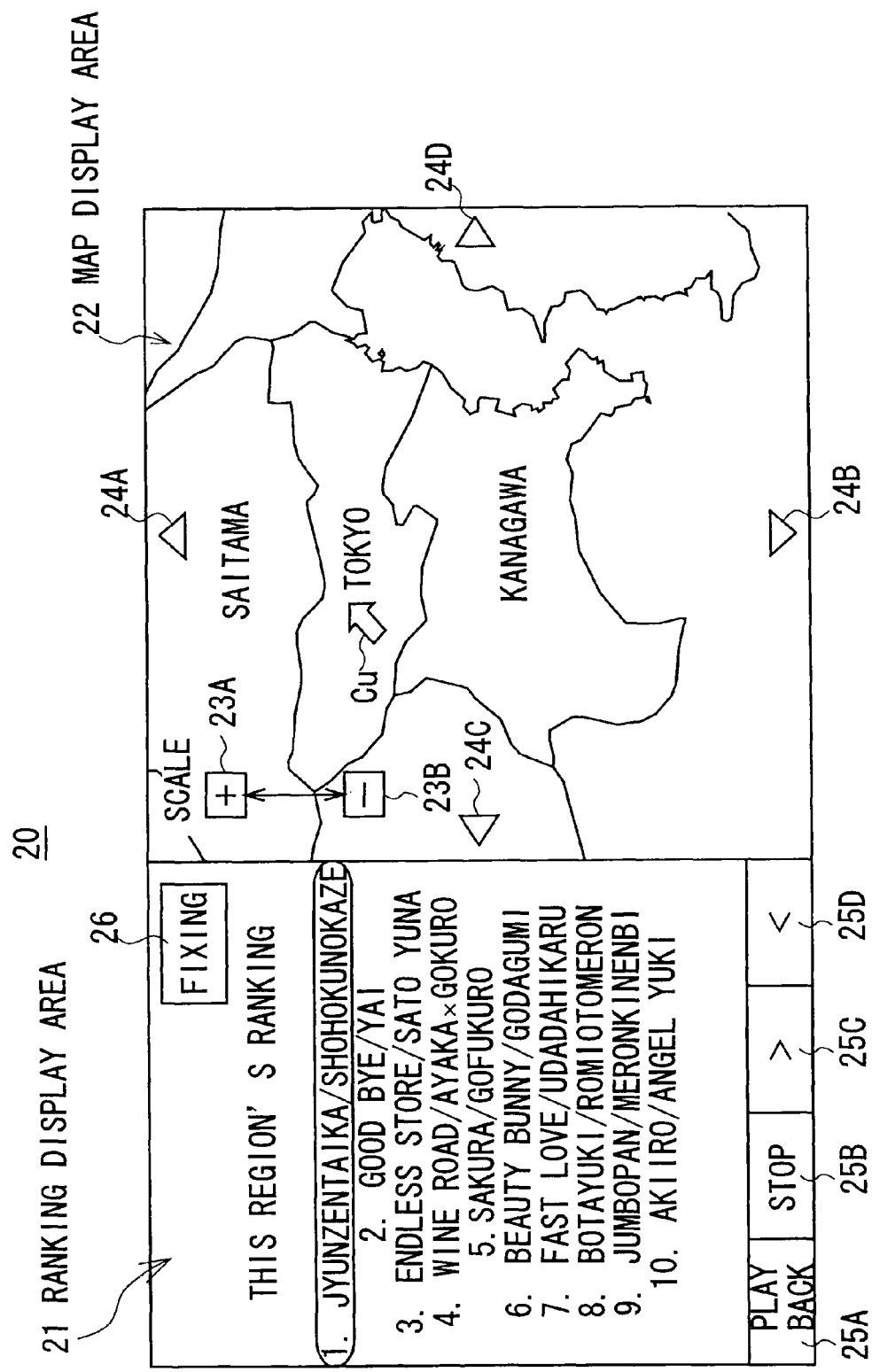
FIG. 12 is a schematic diagram illustrating the configuration of a regional popular music ranking screen (5)

If the display control section 45B eventually displays an enlarged map of Tokyo and adjacent areas (such as Tokyo and Kanagawa, and part of Chiba, Saitama and Shizuoka) on the map display area 22 as shown in FIG. 12, the ranking acquisition section 45D recognizes from the scale of the map that each prefecture should be recognized as one region.

Therefore, the ranking acquisition section 45D retrieves from the popular music ranking table Tb the popular music ranking lists of all the regions (or prefectures) displayed. In this case, the ranking acquisition section 45D retrieves the Tokyo's, Kanagawa's, Chiba's, Saitama's and Shizuoka's popular music ranking lists (i.e. those of the five prefectures of Japan).

The ranking acquisition section 45D counts the number of downloading for each piece of music data (or each piece of music identification information) listed in the five prefectures' popular music ranking lists and then lists the pieces of music identification information in order of the number of downloading. The ranking acquisition section 45D subsequently extracts the top ten pieces to generate a general popular music ranking list of the five prefectures.

The display control section 45B then displays the five prefectures' general popular music ranking list on the ranking display area 21 of the regional popular music ranking screen 20.

In that manner, if the scale of the map display area 22 is changed to show a specific region or regions, the ranking display area 21 is updated to display the popular music ranking list of that region or regions.

At the same time, the playback control section 45C regards the general popular music ranking list displayed on the ranking display area 21 as a play list and starts playing back the pieces of music data listed in the play list.

Figure 13:
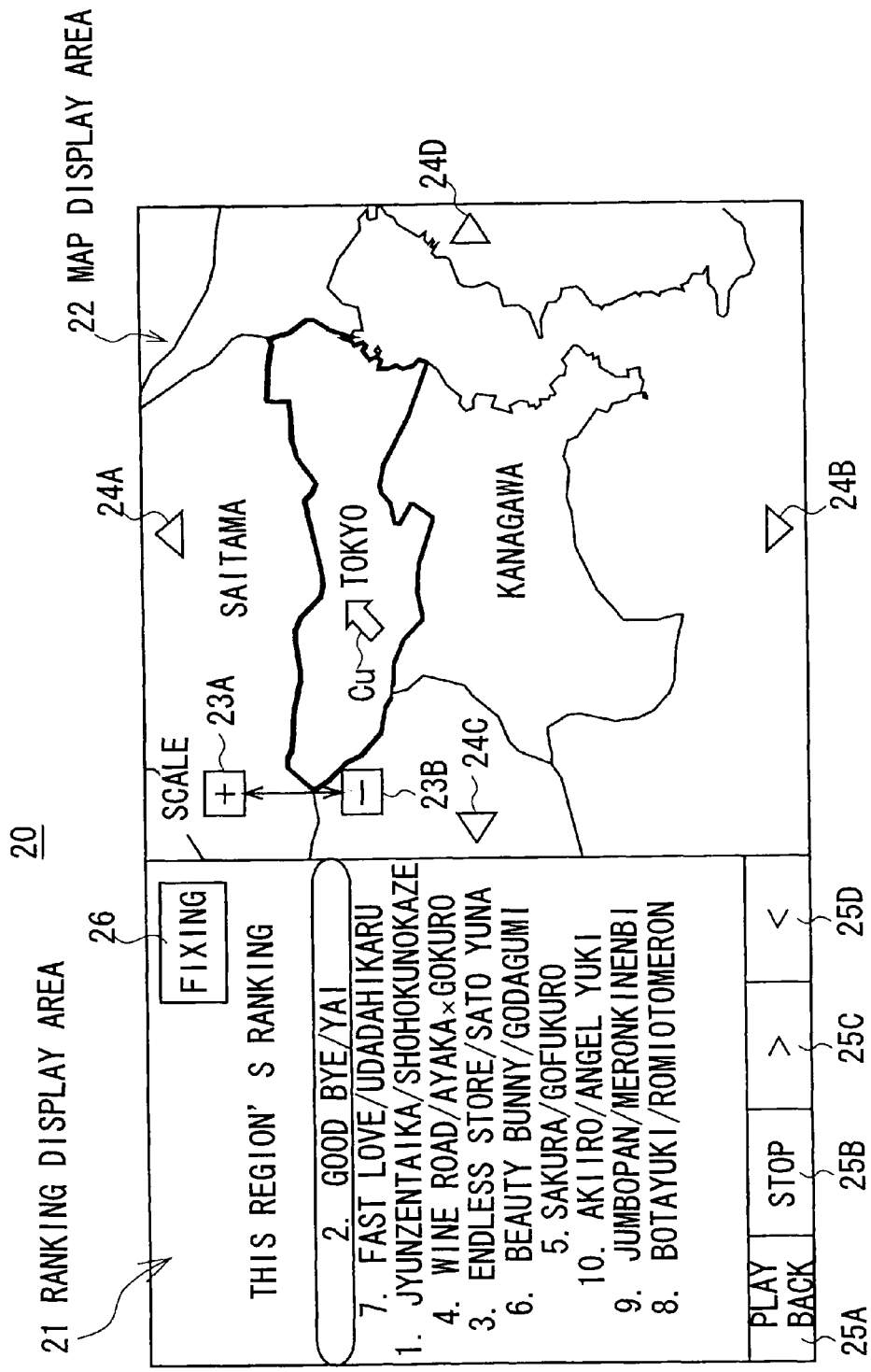
FIG. 13 is a schematic diagram illustrating the configuration of a regional popular music ranking screen (6)

After that, if a specific region is selected by a cursor Cu from among the regions displayed on the map display area 22 (Tokyo, for example), the display control section 45 highlights the selected region as shown in FIG. 13.

At this time, the ranking acquisition section 45D determines that another region has been specified as a specified region replacing the previous one. The ranking acquisition section 45D therefore retrieves from the popular music ranking table Tb the popular music ranking list of the region specified by the cursor Cu (Tokyo, for example).

The display control section 45B of the music playback terminal PL displays the Tokyo's popular music ranking list on the ranking display area 21 of the regional popular music ranking screen 20.

At the same time, the playback control section 45C of the music playback terminal PL regards the Tokyo's popular music ranking list displayed on the ranking display area 21 as a play list and then starts playing the pieces of music data listed in the play list.

After that, when the map displayed is enlarged or reduced by the scale changing buttons 23 or is shifted to another region by the region shifting buttons 24 (also referred to as "scale-changing operation" and "region-shifting operation", respectively), the display control section 45B of the music playback terminal PL changes the piece of map information displayed on the map display area 22 and therefore recognizes the region (Tokyo, in this case) is not the specified region anymore.

Figure 14:
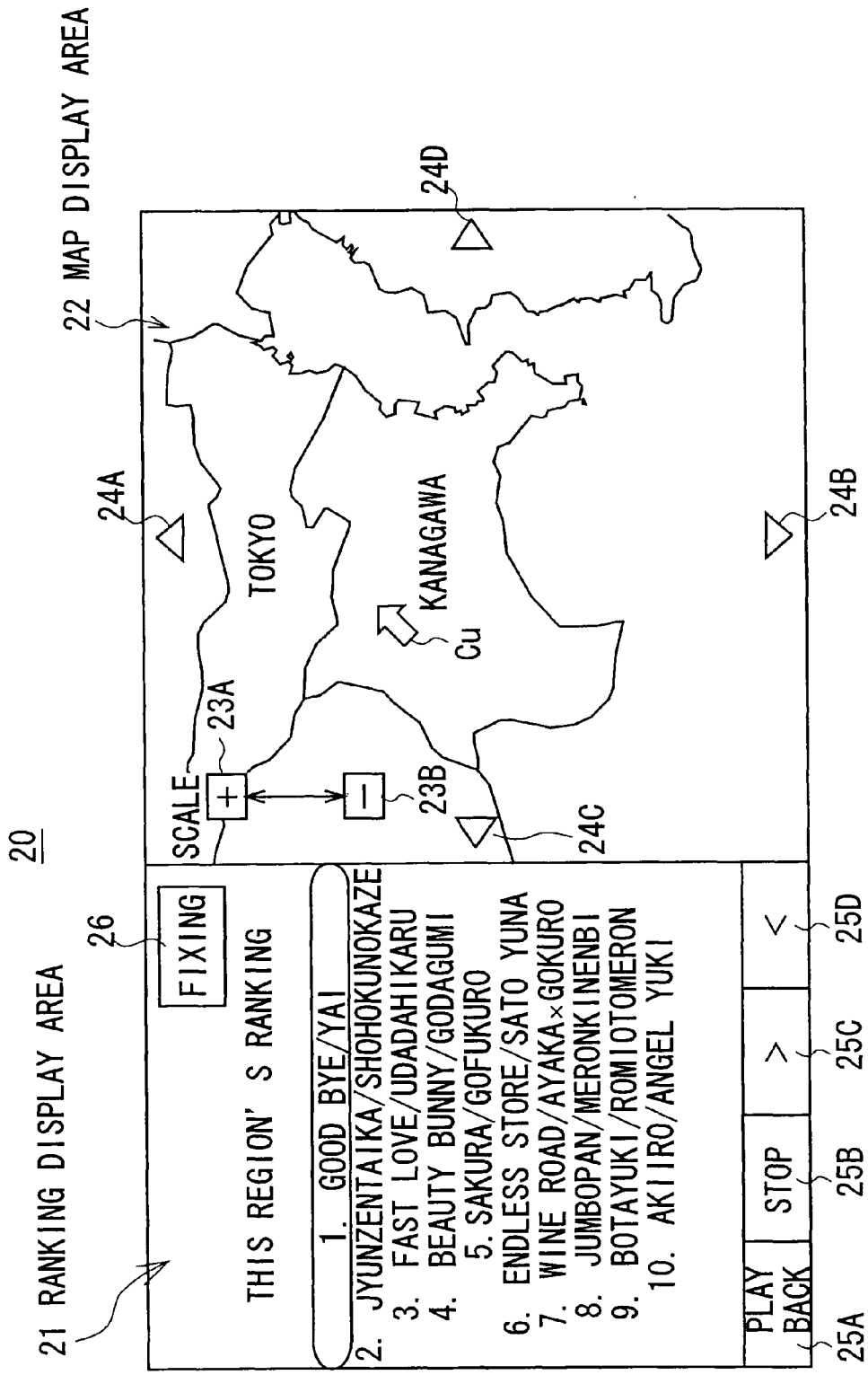
FIG. 14 is a schematic diagram illustrating the configuration of a regional popular music ranking screen (7)

If the display control section 45B eventually displays a map of Kanagawa and adjacent areas on the map display area 22 as shown in FIG. 14, the ranking acquisition section 45D retrieves from the popular music ranking table Tb the popular music ranking lists of all the regions (or prefectures) displayed and combines them to generate a general popular music ranking list.

The display control section 45B then removes the Tokyo's popular music ranking list and instead displays the generated general popular music ranking list on the ranking display area 21 of the regional popular music ranking screen 20.

At the same time, the playback control section 45C regards the general popular music ranking list displayed on the ranking display area 21 as a play list and starts playing back the pieces of music data listed in the play list.

As described in the above operational procedure, the music playback terminal PL is designed to display a piece of map information (or map) of a region specified by a user on the map display area 22 of the regional popular music ranking screen 20 as well as a popular music ranking list of the region on the ranking display area 21.

By the way, the above procedure is one example; there are other procedures, some of which combine or/and repeat parts of the above procedure.

(1-2-4) Operational Procedure

The following describes an operational procedure, which starts with the generation of the popular music ranking table Tb and ends with the playback of the pieces of music data listed in the popular music ranking list displayed.

The operational procedure is divided into two: one is an operational procedure of the regional popular music ranking provision server 12 while the other is an operational procedure of the music playback terminal PL.

Figure 15:
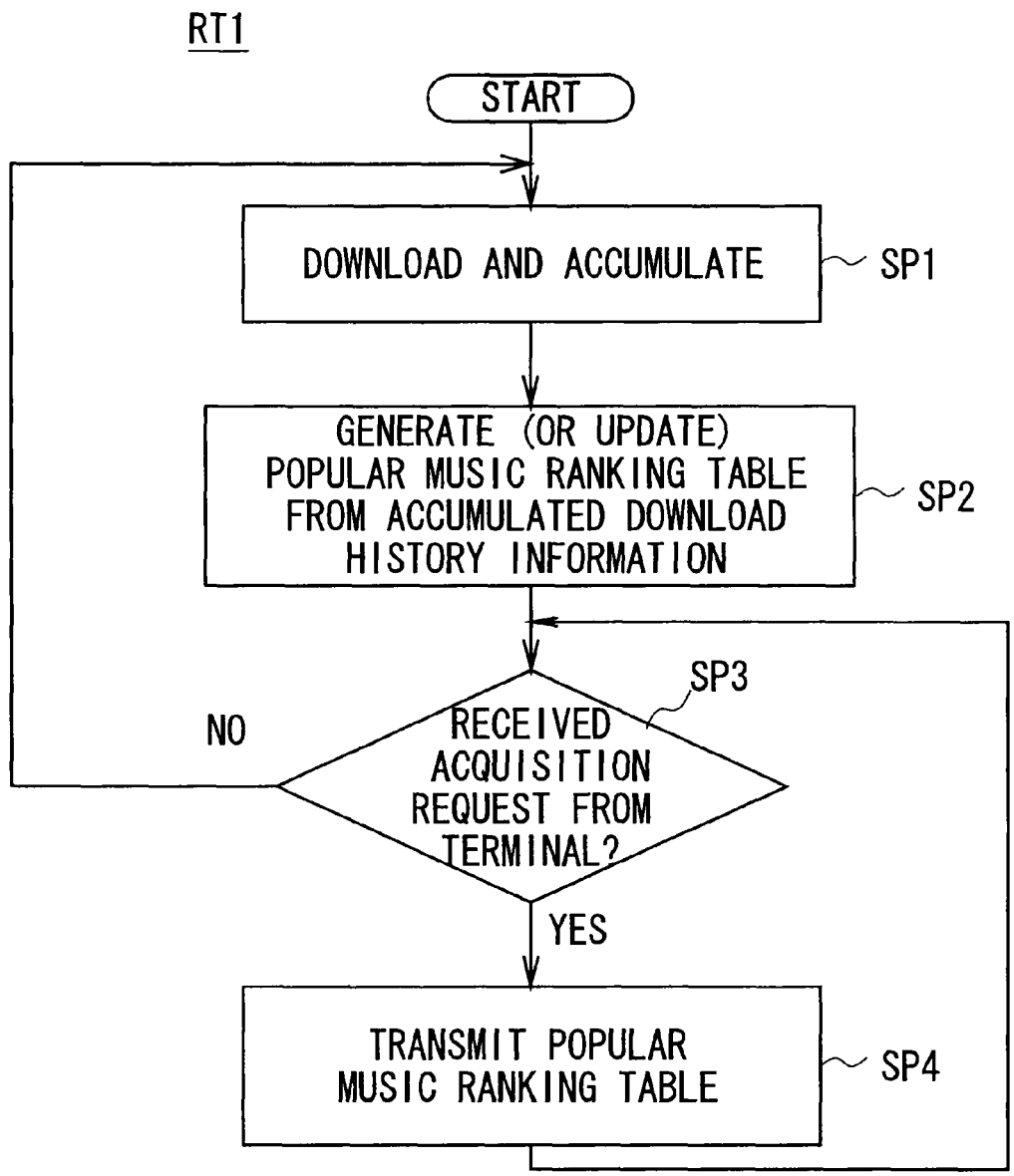
FIG. 15 is a flowchart illustrating a procedure of an operational process of the regional popular music ranking provision server.

FIG. 15 is a flowchart illustrating the procedure RT1 of the regional popular music ranking provision server 12, which is actually performed by the control section 31 (the communication control section 31A and the table generation section 31B) of the regional popular music ranking provision server 12.

When the music playback terminal PL transmits a piece of download history information, the communication control section 31A of the regional popular music ranking provision server 12 at step SP1 receives it by using the communication section 30 and then stores it in the storage section 32. The pieces of download history information accumulate in the storage section 32. The table generation section 31B at subsequent step SP2 generates (or updates) the popular music ranking table TB based on the pieces of download history information stored in the storage section 32 and then stores it in the storage section 32.

The communication control section 31A at subsequent step SP3 checks if the communication section 30 has already received the acquisition request of the popular music ranking table Tb from the music playback terminal PL. If the negative result is obtained at step SP3, then this means that the music playback terminal PL has not transmitted the acquisition request of the popular music ranking table Tb yet. In this case, the communication control section 31A returns to step SP1 when it receives a piece of download history information from the music playback terminal PL again.

Whereas if the affirmative result is obtained at step SP3, then this means that the music playback terminal PL has already transmitted the acquisition request of the popular music ranking table Tb. In this case, the communication control section 31A reads out the popular music ranking table Tb from the storage section 32 and then transmits it to the music playback terminal PL by using the communication section 30.

After that, the communication control section 31A returns to step SP3 to check if it has received the acquisition request of the popular music ranking table Tb from the music playback terminal PL again.

In that manner, the regional popular music ranking provision server 12 performs the operational procedure RT1 to provide the music playback terminal PL with the popular music ranking table Tb.

Figure 16:
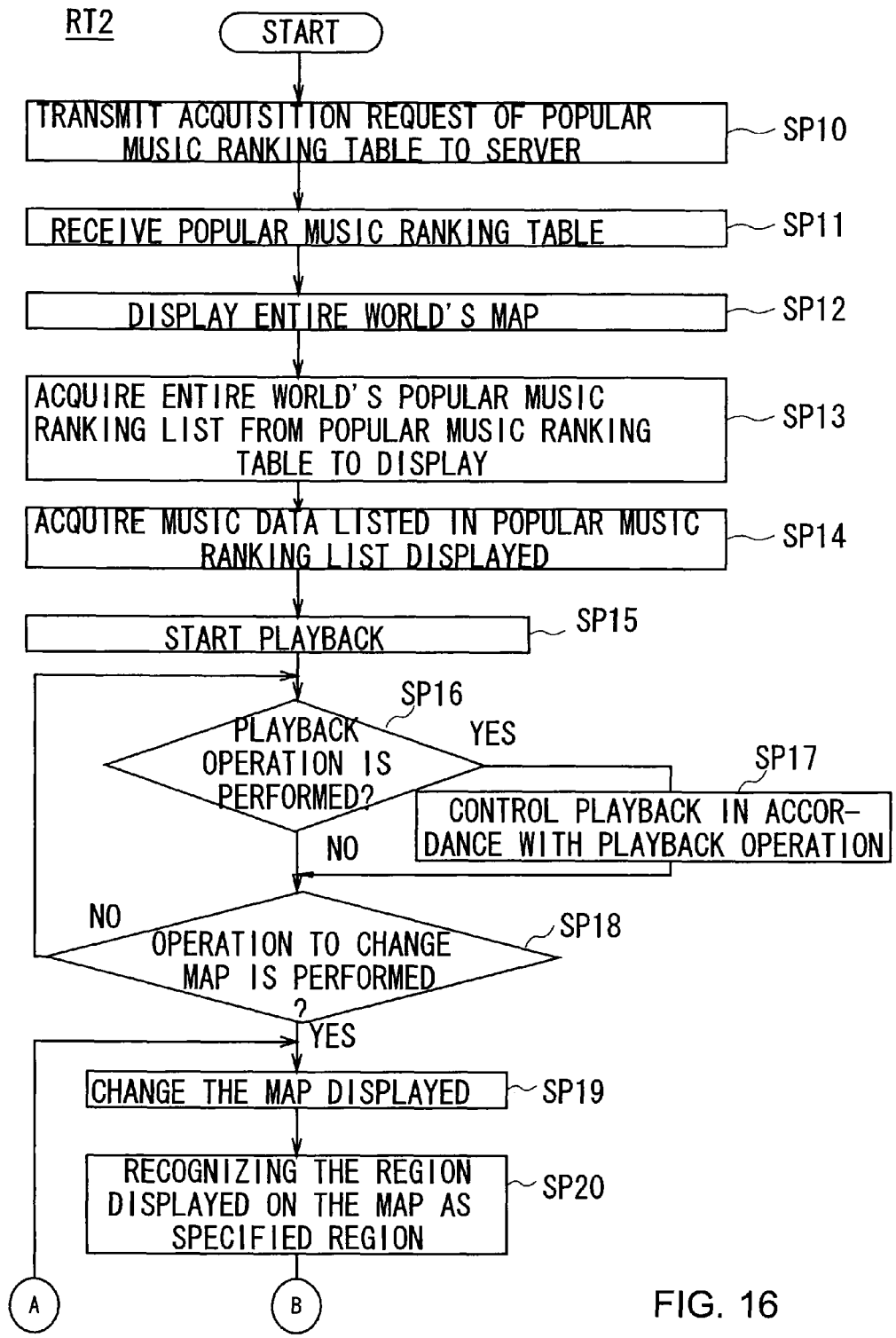
FIG. 16 is a flowchart illustrating a procedure of an operational process of the music playback terminal.
Figure 17:
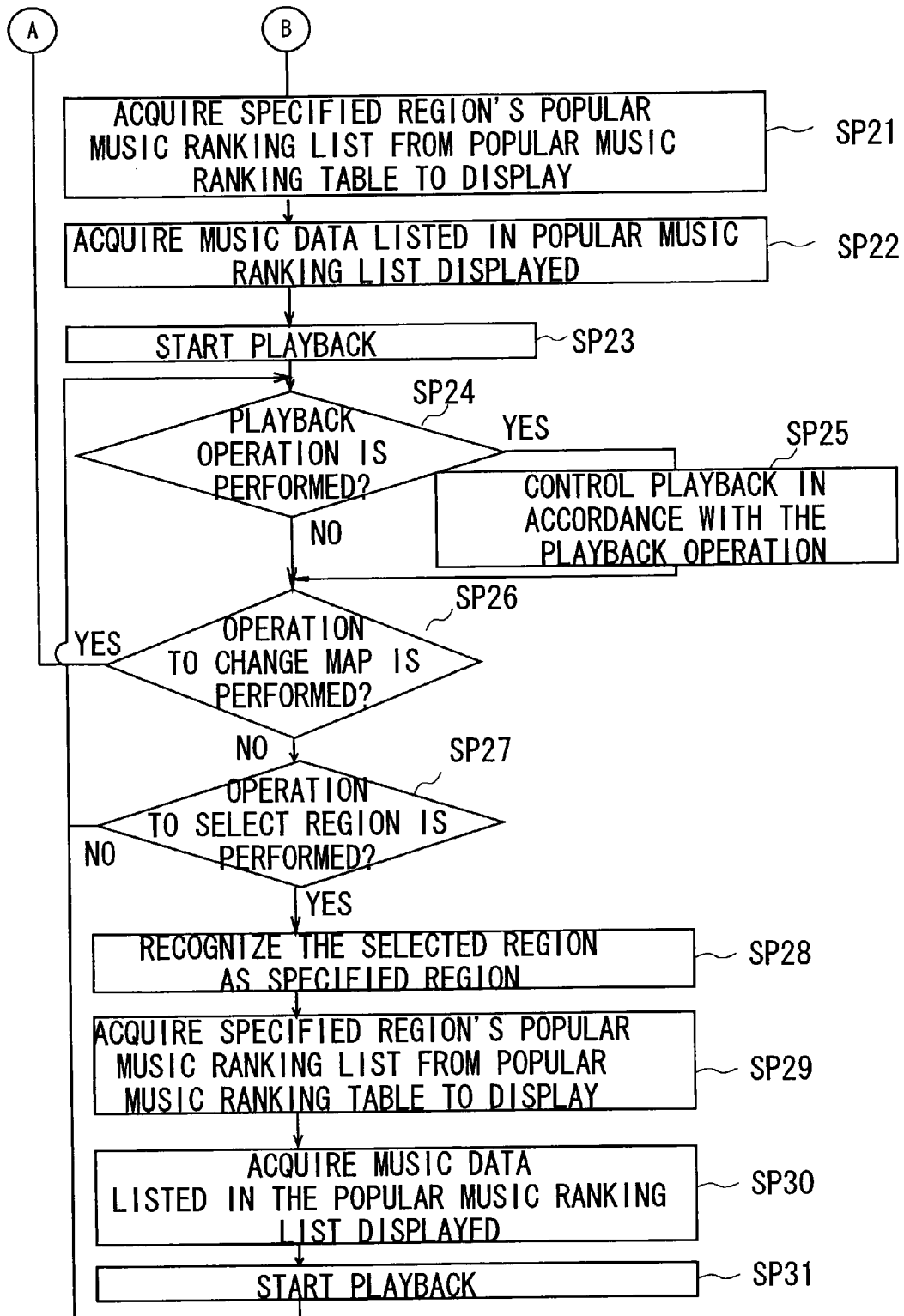
FIG. 17 is a flowchart illustrating a procedure following that of FIG. 16.

FIGS. 16 and 17 are a flowchart illustrating the operational procedure RT2 of the music playback terminal PL, which is actually performed by the control section 45 of the music playback terminal PL (the communication control section 45A, the display control section 45B, the playback control section 45C and the ranking acquisition section 45D).

When it is for example instructed by the operation section 40 to start an application program to display the regional popular music ranking screen 20, the communication control section 45A of the music playback terminal PL at step SP10 transmits the acquisition request of the popular music ranking table Tb to the regional popular music ranking provision server 12 by using the communication section 41, and then proceeds to next step SP11.

At step SP11, the communication control section 45A receives, after transmitting the acquisition request, the popular music ranking table Tb from the regional popular music ranking provision server 12 by using the communication section 41, and then stores it in the storage section 46.

At subsequent step SP12, the display control section 45B displays on the display section 42 the regional popular music ranking screen 20 that shows the piece of map information (or map) of the entire world.

At subsequent step SP13, the ranking acquisition section 45D retrieves from the popular music ranking table Tb stored in the storage section 46 the entire world's popular music ranking list (the U.S.A.'s popular music ranking list, for example), and then displays it on the ranking display area 21 of the regional popular music ranking screen 20.

At subsequent step SP14, the playback control section 45C reads out from the storage section 46 (or acquires, under the control of the communication control section 45A, from the music provision server 11) the pieces of music data corresponding to the pieces of music identification information listed in the popular music ranking list displayed on the ranking display area 21, and then proceeds to next step SP15. At step SP15, the playback control section 45C controls the playback section 43 to play back those pieces of music data, and then proceeds to next step SP16.

At step SP16, the playback control section 45C checks if a playback operation is performed on the playback operation buttons 25. If the affirmative result is obtained at step SP16, the playback control section 45C proceeds to step SP17, and then regards the popular music ranking list displayed as a play list to perform a playback control process for the currently-played piece of music data.

Whereas if the negative result is obtained at step SP16 or the process of step SP17 is completed, the display control section 45B at subsequent step SP18 checks if the scale changing buttons 23 or the region shifting buttons 24 are being controlled to change the piece of map information (or map). If the negative result is obtained at step SP18, then this means that the piece of map information has not been changed yet. In this case, the display control section 45B returns to step SP16 to check if a playback operation is performed on the playback operation buttons 25 again.

Whereas if the affirmative result is obtained at step SP18, the display control section 45B at subsequent step SP19 changes the piece of map information (or map) displayed on the map display area 22 accordingly.

At subsequent step SP20, the ranking acquisition section 45D regards the region displayed as a specified region, and then proceeds to next step SP21 (FIG. 17). At step SP21, the ranking acquisition section 45D retrieves from the popular music ranking table Tb stored in the storage section 46 the specified region's popular music ranking list and displays it on the ranking display area 21 of the regional popular music ranking screen 20. If there are a plurality of regions displayed on the map display area 22, the ranking acquisition section 45D acquires those regions' popular music ranking lists, combines them to generate a general popular music ranking list and displays it on the ranking display area 21.

At subsequent step SP22, the playback control section 45C reads out from the storage section 46 (or acquires, under the control of the communication control section 45A, from the music provision server 11) the pieces of music data corresponding to the pieces of music identification information listed in the popular music ranking list displayed on the ranking display area 21, and then proceeds to next step SP23. At step SP23, the playback control section 45C controls the playback section 43 to play back those pieces of music data, and then proceeds to next step SP24.

At step SP24, the playback control section 45C checks if a playback operation is performed on the playback operation buttons 25. If the affirmative result is obtained at step SP24, the playback control section 45C proceeds to step SP25, and then regards the popular music ranking list displayed as a play list to perform a playback control process for the currently-played piece of music data.

Whereas if the negative result is obtained at step SP24 or the process of step SP25 is completed, the display control section 45B at subsequent step SP26 checks if the scale changing buttons 23 or the region shifting buttons 24 are being controlled to change the piece of map information (or map). If the affirmative result is obtained at step SP26, the display control section 45B returns to step SP19 to change the piece of map information (or map) displayed on the map display area 22 accordingly.

Whereas if the negative result is obtained at step SP26, the display control section 45B proceeds to step SP27 to check if a certain region is specified by the cursor Cu. If the negative result is obtained at step SP27, the display control section 45B returns to step SP24 to check if a playback operation is performed by the playback control section 45C again.

Whereas if the affirmative result is obtained at step SP27, the ranking acquisition section 45D at subsequent step SP28 regards the region specified by the cursor Cu as a specified region, and then proceeds to step SP29. At step SP29, the ranking acquisition section 45D retrieves from the popular music ranking table Tb stored in the storage section 46 the specified region's popular music ranking list, and then displays it on the ranking display area 21 of the regional popular music ranking screen 20.

At subsequent step SP30, the playback control section 45C reads out from the storage section 46 (or acquires, under the control of the communication control section 45A, from the music provision server 11) the pieces of music data corresponding to the pieces of music identification information listed in the popular music ranking list displayed on the ranking display area 21, and then proceeds to next step SP31. At step SP31, the playback control section 45C controls the playback section 43 to play back those pieces of music data, and then returns to step SP24 to check if a playback operation is performed.

In that manner, the music playback terminal PL performs the operational procedure RT2 to display a piece of map information of a region specified by a user as well as this region's popular music ranking list. In addition, the music playback terminal PL plays back the pieces of music data listed in the region's popular music ranking list.

(1-2-5) Operation and Effect of First Embodiment

As described above, in the regional popular music ranking provision system 10, the music playback terminal PL receives from the regional popular music ranking provision server 12 the popular music ranking table Tb: The popular music ranking table Tb contains the regions' popular music ranking lists. The music playback terminal PL then stores the popular music ranking table Tb in the storage section 46.

When a certain region is specified by the operation section 40 to display its map (or piece of map information) on the map display area 22 of the regional popular music ranking screen 20, the music playback terminal PL displays it on the map display area 22.

At the same time, the music playback terminal PL acquires from the popular music ranking table Tb a popular music ranking list of the region displayed, and displays the acquired popular music ranking list on the ranking display area 21 of the regional popular music ranking screen 20.

In this manner, a user just specifies a certain region and then the music playback terminal PL retrieves this region's popular music ranking list to display.

If there is a plurality of regions displayed on the map display area 22, the music playback terminal PL retrieves from the popular music ranking table Tb those regions' popular music ranking lists, combines them to generate a general popular music ranking list and then displays it on the ranking display area 21.

In that manner, while displaying a plurality of regions to allow a user to choose a specific region, the music playback terminal PL can provide a user with the general popular music ranking list, which combines those regions' popular music ranking lists.

Moreover, the music playback terminal PL regards the popular music ranking list displayed as a play list and then acquires the pieces of music data listed in the list to play back. Accordingly, a user can listen to the pieces of music data listed in the specified region's popular music ranking list displayed on the music playback terminal PL.

According to the above configuration, a user just specifies a certain region to display and then the music playback terminal PL acquires a popular music ranking list of the specified region. The music playback terminal PL then plays back the pieces of music data listed in the acquired list. Accordingly, a user can listen to the pieces of music data popular in the region without going there.

(2) Second Embodiment

The following describes a second embodiment. The second embodiment is different from the first embodiment in which what the music playback terminal PL downloads from the regional popular music ranking provision server 12 is the popular music ranking table Tb, which is used for acquiring the specified region's popular music ranking list. In the second embodiment, what the music playback terminal PL downloads from the regional popular music ranking provision server 12 is the specified region's popular music ranking list, not the popular music ranking table Tb.

Except its method of acquiring the popular music ranking list, the second embodiment is almost the same as the first embodiment in terms of the system's configuration, and the functional configurations of the regional popular music ranking provision server 12 and the music playback terminal PL. Accordingly, the following primarily describes an acquisition process of the popular music ranking list.

(2-1) Acquisition Process of Popular Music Ranking List

Figure 18:
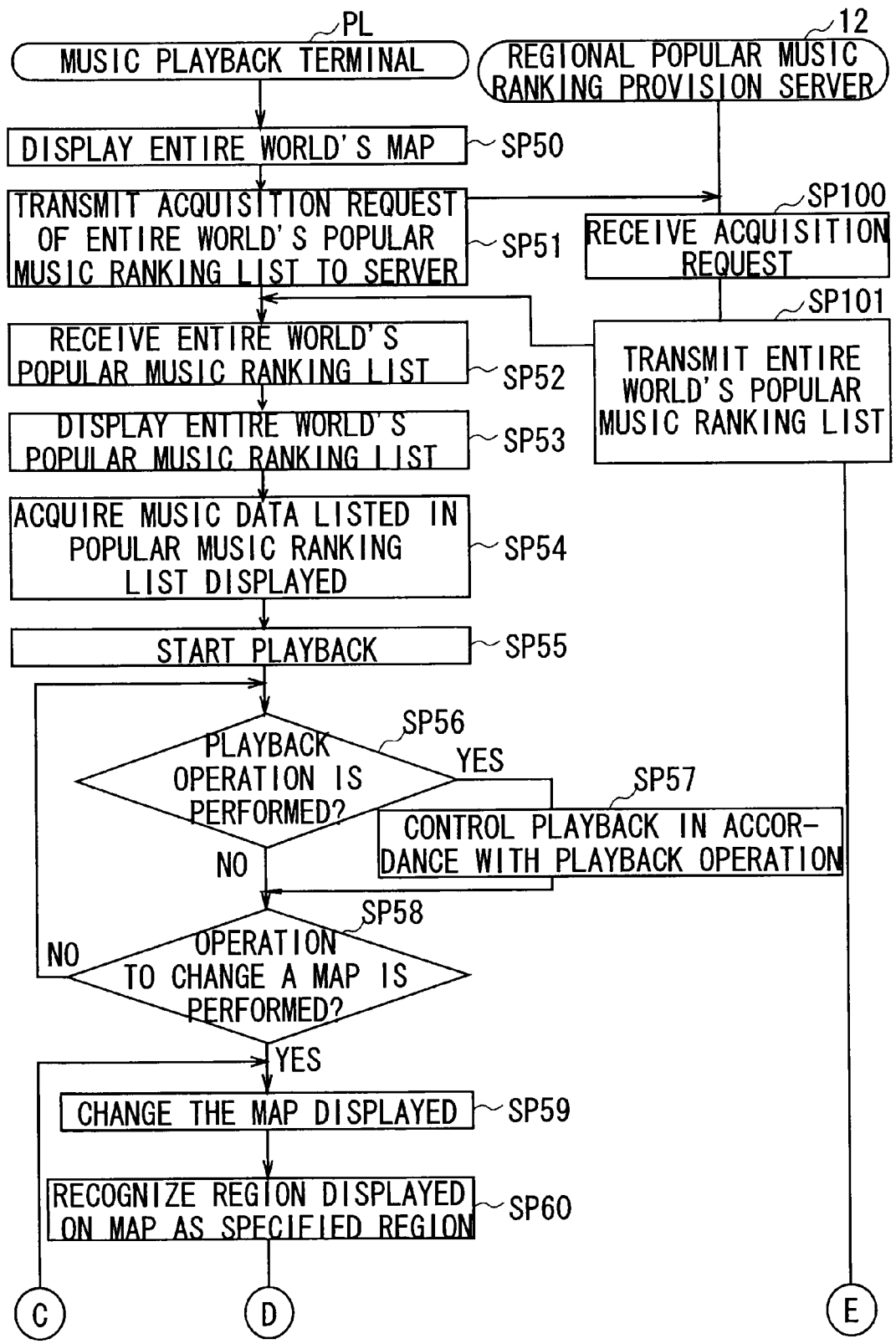
FIG. 18 is a sequence chart illustrating a procedure of an acquisition process of a popular music ranking list.
Figure 19:
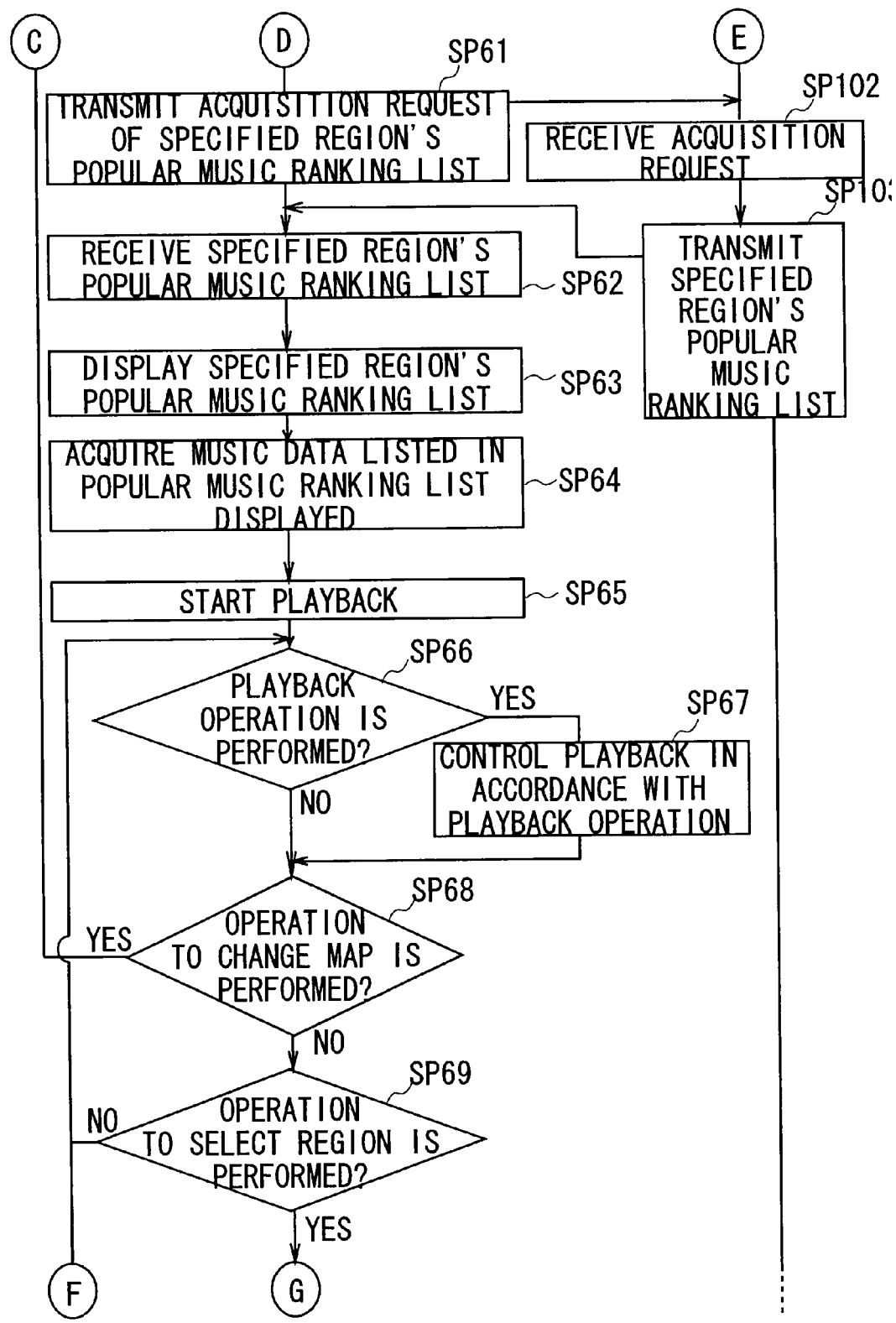
FIG. 19 is a sequence chart illustrating a procedure following that of FIG. 18.
Figure 20:
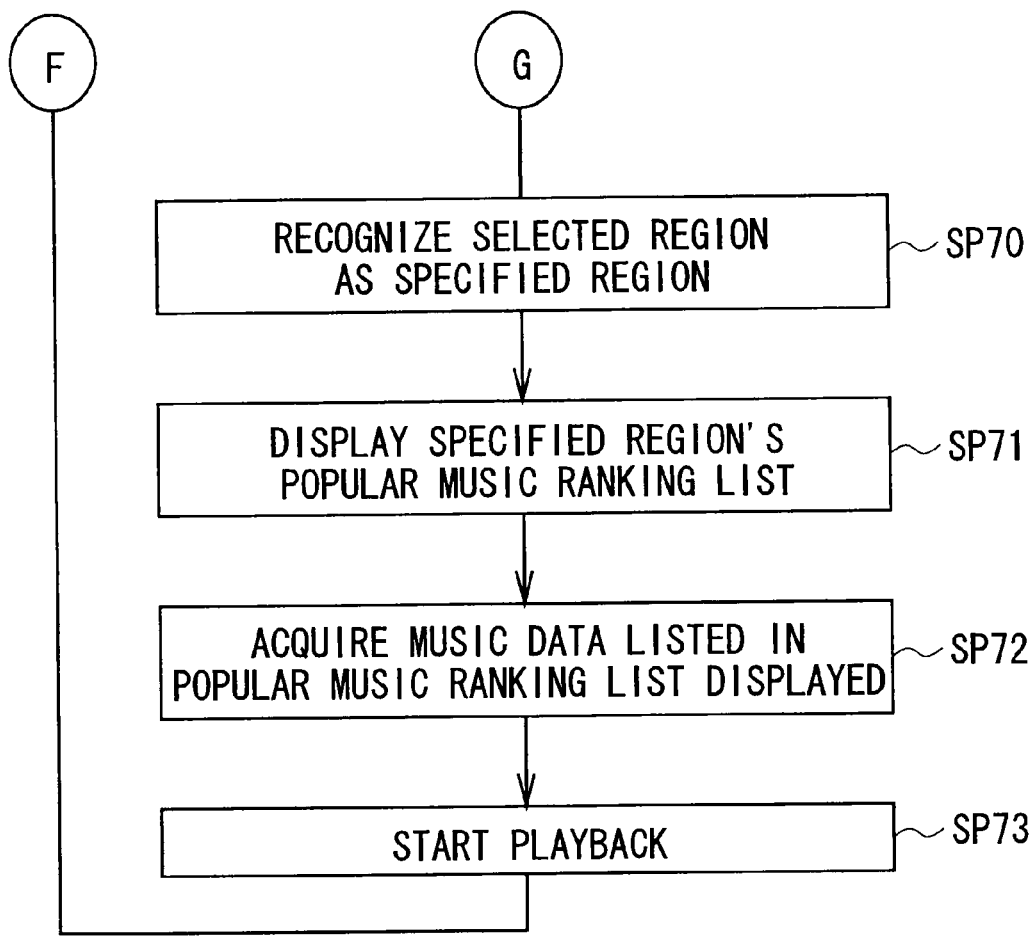
FIG. 20 is a sequence chart illustrating a procedure following that of FIG. 19.

FIGS. 18, 19 and 20 are flowcharts illustrating the acquisition process of the popular music ranking list, in which the music playback terminal PL acquires the specified region's popular music ranking list from the regional popular music ranking provision server 12. This process is actually performed by the control section 45 of the music playback terminal PL (the communication control section 45A, the display control section 45B, the playback control section 45C and the ranking acquisition section 45D) and the control section 31 of the regional popular music ranking provision server 12 (the communication control section 31A). In the regional popular music ranking provision server 12, the popular music ranking table Tb is generated by the table generation section 31B and is stored in the storage section 32 in the same way as the first embodiment.

When it is for example instructed by the operation section 40 to start an application program to display the regional popular music ranking screen 20, the display control section 45B of the music playback terminal PL as step SP50 displays on the display section 42 the regional popular music ranking screen 20 that shows the piece of map information (or map) of the entire world on the map display area 22.

At subsequent step SP51, the ranking acquisition section 45D of the music playback terminal PL controls the communication control section 45A to transmit the acquisition request of the entire world's popular music ranking list (the U.S.A.'s popular music ranking list, for example) to the regional popular music ranking provision server 12 by using the communication section 41.

The communication control section 31A of the regional popular music ranking provision server 12 at step SP100 receives the acquisition request of the entire world's popular music ranking list from the music playback terminal PL by using the communication section 30, and then proceeds to next step SP101.

At step SP101, the communication control section 31A of the regional popular music ranking provision server 12 retrieves, in accordance with the acquisition request received from the music playback terminal PL, from the popular music ranking table Tb stored in the storage section 32 the entire world's popular music ranking list, and then transmits it to the music playback terminal PL by using the communication section 30.

The ranking acquisition section 45D of the music playback terminal PL step SP52 controls the communication control section 45A to receive the entire world's popular music ranking list from the regional popular music ranking provision server 12 through the communication section 41.

At subsequent step SP53, the display control section 45B of the music playback terminal PL displays the entire world's popular music ranking list received by the ranking acquisition section 45D on the ranking display area 21 of the regional popular music ranking screen 20.

At subsequent step SP54, the playback control section 45C reads out from the storage section 46 (or acquires, under the control of the communication control section 45A, from the music provision server 11) the pieces of music data corresponding to the pieces of music identification information listed in the popular music ranking list displayed on the ranking display area 21, and then proceeds to next step SP55. At step SP55, the playback control section 45C controls the playback section 43 to play back those pieces of music data, and then proceeds to next step SP56.

At step SP56, the playback control section 45C checks if a playback operation is performed on the playback operation buttons 25. If the affirmative result is obtained at step SP56, the playback control section 45C proceeds to step SP57, and then regards the popular music ranking list displayed as a play list to perform a playback control process for the currently-played piece of music data.

Whereas if the negative result is obtained at step SP56 or the process of step SP57 is completed, the display control section 45B at subsequent step SP58 checks if the scale changing buttons 23 or the region shifting buttons 24 are being controlled to change the piece of map information (or map). If the negative result is obtained at step SP58, then this means that the piece of map information has not been changed yet. In this case, the display control section 45B returns to step SP56 to check if a playback operation is performed on the playback operation buttons 25 again.

Whereas if the affirmative result is obtained at step SP58, the display control section 45B at subsequent step SP59 changes the piece of map information (or map) displayed on the map display area 22 accordingly.

At subsequent step SP60, the ranking acquisition section 45D of the music playback terminal PL regards the region displayed as a specified region, and then proceeds to next step SP61 (FIG. 19). At step SP61, the ranking acquisition section 45D controls the communication control section 45A to transmit the acquisition request of the specified region's popular music ranking list to the regional popular music ranking provision server 12 by using the communication section 41. By the way, if there are a plurality of regions displayed on the map display area 22, the ranking acquisition section 45D transmits to the regional popular music ranking provision server 12 the acquisition request of those regions' popular music ranking lists.

The communication control section 31A of the regional popular music ranking provision server 12 at step SP102 receives the acquisition request of the specified region's popular music ranking list from the music playback terminal PL by using the communication section 30, and then proceeds to next step SP103.

At step SP103, the communication control section 31A of the regional popular music ranking provision server 12 retrieves, in accordance with the acquisition request received from the music playback terminal PL, from the popular music ranking table Tb stored in the storage section 32 the specified region's popular music ranking list, and then transmits it to the music playback terminal PL by using the communication section 30.

The ranking acquisition section 45D of the music playback terminal PL at step SP62 controls the communication control section 45A to receive the specified region's popular music ranking list from the regional popular music ranking provision server 12 through the communication section 41: If the ranking acquisition section 45D at step SP62 receives a plurality of popular music ranking lists of the specified regions, it combines them to generate a general popular music ranking list.

At subsequent step SP63, the display control section 45B of the music playback terminal PL displays the specified region's popular music ranking list received by the ranking acquisition section 45D on the ranking display area 21 of the regional popular music ranking screen 20.

At subsequent step SP64, the playback control section 45C reads out from the storage section 46 (or acquires, under the control of the communication control section 45A, from the music provision server 11) the pieces of music data corresponding to the pieces of music identification information listed in the popular music ranking list displayed on the ranking display area 21, and then proceeds to next step SP65. At step SP65, the playback control section 45C controls the playback section 43 to play back those pieces of music data, and then proceeds to next step SP66.

At step SP66, the playback control section 45C checks if a playback operation is performed on the playback operation buttons 25. If the affirmative result is obtained at step SP66, the playback control section 45C proceeds to step SP67, and then regards the popular music ranking list displayed as a play list to perform a playback control process for the currently-played piece of music data.

Whereas if the negative result is obtained at step SP66 or the process of step SP67 is completed, the display control section 45B at subsequent step SP68 checks if the scale changing buttons 23 or the region shifting buttons 24 are being controlled to change the piece of map information (or map). If the affirmative result is obtained at step SP68, the display control section 45B returns to step SP59 to change the piece of map information (or map) displayed on the map display area 22 accordingly.

Whereas if the negative result is obtained at step SP68, the display control section 45B proceeds to step SP69 to check if a certain region is specified by the cursor Cu. If the negative result is obtained at step SP69, the display control section 45B returns to step SP66 to check if a playback operation is performed by the playback control section 45C again.

Whereas if the affirmative result is obtained at step SP69, the ranking acquisition section 45D at subsequent step SP70 (FIG. 20) regards the region specified by the cursor Cu as a specified region, and then proceeds to step SP71. At step SP71, the ranking acquisition section 45D displays the specified region's popular music ranking list, which is the one the music playback terminal PL has acquired at step SP62, on the ranking display area 21 of the regional popular music ranking screen 20 by controlling the display control section 45B.

At subsequent step SP72, the playback control section 45C reads out from the storage section 46 (or acquires, under the control of the communication control section 45A, from the music provision server 11) the pieces of music data corresponding to the pieces of music identification information listed in the popular music ranking list displayed on the ranking display area 21, and then proceeds to next step SP73. At step SP73, the playback control section 45C controls the playback section 43 to play back those pieces of music data, and then returns to step SP66 to check if a playback operation is performed.

In that manner, the music playback terminal PL performs the acquisition process to display a piece of map information of a region specified by a user. In addition, the music playback terminal PL acquires the displayed region's popular music ranking list from the regional popular music ranking provision server 12 and plays back the pieces of music data listed in this list.

As described above, instead of downloading from the regional popular music ranking provision server 12 the popular music ranking table Tb containing the regions' popular music ranking lists, the music playback terminal PL of the second embodiment downloads from the regional popular music ranking provision server 12 one or some of the popular music ranking lists specified by a user. This reduces the amount of data exchanged between the music playback terminal PL and the regional popular music ranking provision server 12, thereby reducing the processing load of the music playback terminal PL. Therefore, the storage section 46 of the music playback terminal PL can be replaced with a smaller-capacity one, and this simplified the structure of the music playback terminal PL.

(3) Third Embodiment

The following describes the hardware configuration of the third embodiment, which has the same functions as the regional popular music ranking provision server 12 and music playback terminal PL of the first and second embodiments.

Figure 21:
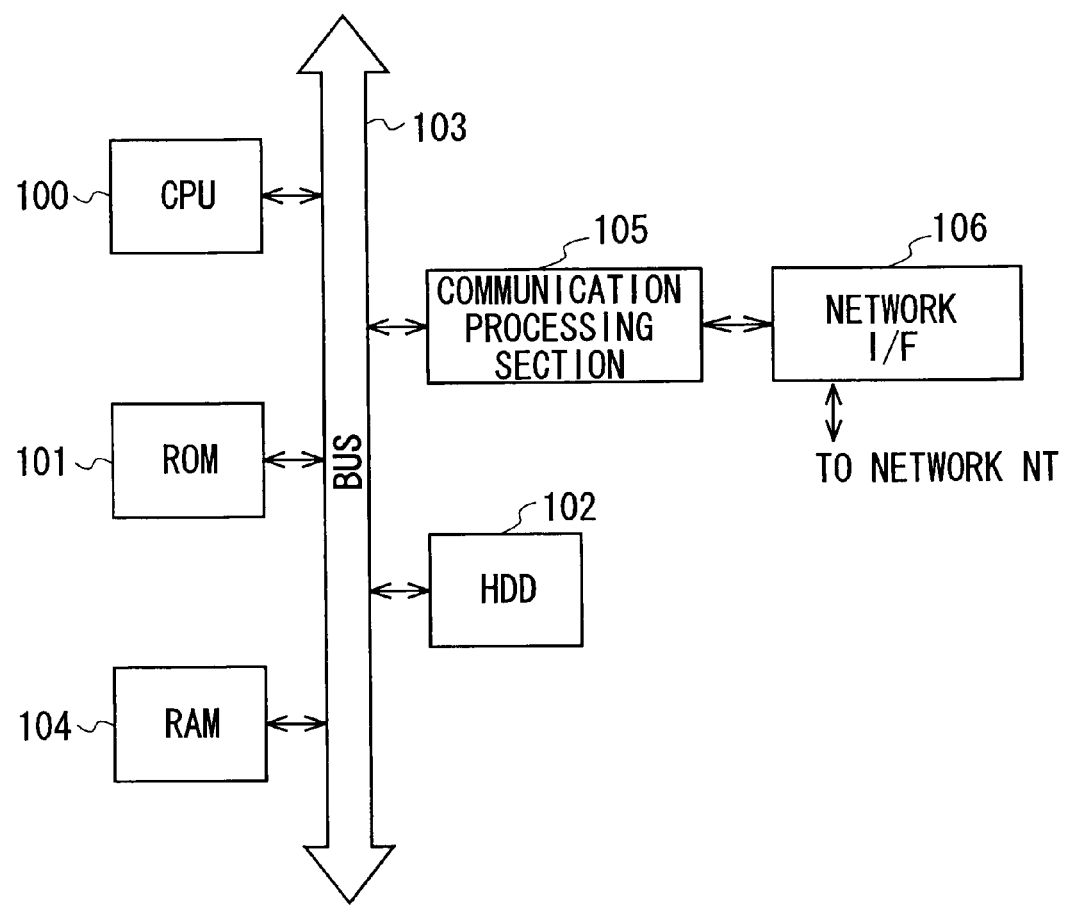
FIG. 21 is a block diagram illustrating the hardware configuration of a regional popular music ranking provision server according to a third embodiment of the present invention.

FIG. 21 illustrates the hardware configuration of the regional popular music ranking provision server 12, while its functional configuration has been illustrated in the above first and second embodiments. The regional popular music ranking provision server 12 includes a Central Processing Unit (CPU) 100. The CPU 100 reads out from a Read Only Memory (ROM) 101 or a hard disk drive 102 a basic program and other application programs and then loads them onto a Random Access Memory (RAM) 104 via a bus 103. Following those programs loaded on the RAM 104, the CPU 100 takes overall control of the server 12 and performs various processes including the generation process of the popular music ranking table Tb.

More specifically, the CPU 100 can access the music playback terminal PL on the network NT to exchange various kinds of data with it by controlling a communication processing section 105 and a network interface 106.

The hard disk drive 102 can store various kinds of data, which the CPU 100 reads out when needed, such as those exchanged between the server 12 and the music playback terminal PL or those used for producing the other data. Actually, the hard disk drive 102 stores the pieces of download history information, the popular music ranking table Tb and the like, some or all of which are read out when needed.

If the programs stored in the ROM 101 or the hard disk drive 102 are designed to realize the functions of the first or second embodiment's regional popular music ranking provision server 12, the CPU 100 can perform the same processes as those of the first or second embodiment's regional popular music ranking provision server 12, with the CPU 100 working in the same way as the control section 31, the communication processing section 105 and the network interface 106 working in the same way as the communication section 30, and the hard disk drive 102 working in the same way as the storage section 32.

Therefore, the regional popular music ranking provision server 12, whose hardware configuration is illustrated in FIG. 21, can offer the same functions and effects as those of the first and second embodiments.

Figure 22:
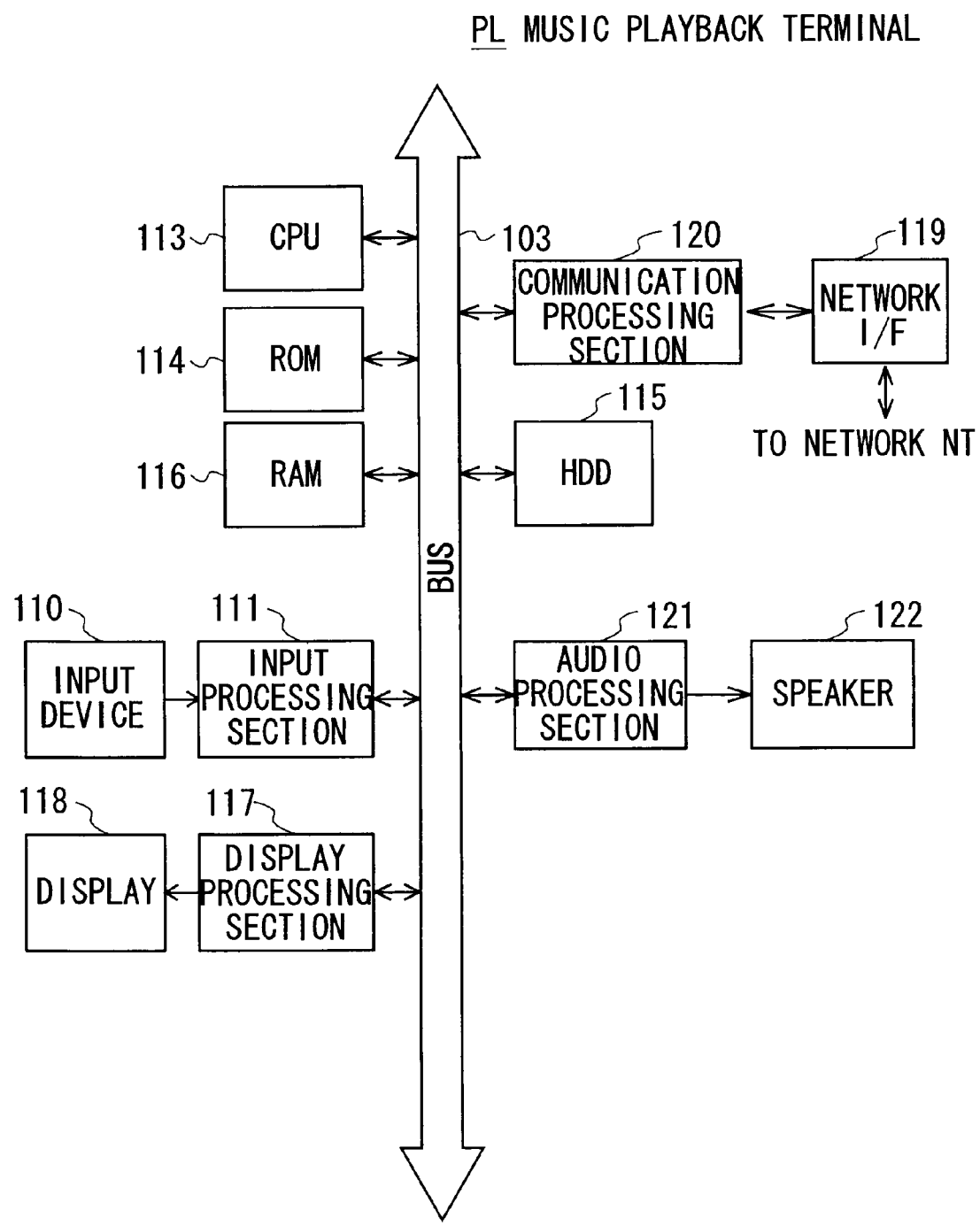
FIG. 22 is a block diagram illustrating the hardware configuration of a music playback terminal according to a third embodiment of the present invention.

FIG. 22 illustrates the hardware configuration of the music playback terminal PL, while its functional configuration has been illustrated in the above first and second embodiments. When a user operates an input device 110 of the music playback terminal PL (such as a keyboard or a mouse), an input device 110 recognizes it. Based on the recognized operation, the input device 100 generates an operation input signal and supplies it to an input processing section 111. The input processing section 111 performs a predetermined process to the supplied operation input signal to convert it into an operation command, which is then supplied to a CPU 113 via a bus 112.

The CPU 113 reads out from a ROM 114 or a hard disk drive 115 a basic program and other application programs and loads them onto a RAM 116 via a bus 112. Following those programs loaded on the RAM 116, the CPU 113 takes overall control of the terminal PL and performs, in accordance with the operation commands supplied from the input processing section 111, various processes, including the display process of map, the acquisition process of the popular music ranking lists and the playback process of music.

More specifically, for example, when receiving from the input device 110 controlled by a user an operation input signal that orders the terminal PL to display a piece of map information based on the map information data stored in the hard disk drive 115, the CPU 113 reads out from the hard disk drive 115 a piece of map information data of a region specified by the user and supplies it to a display processing section 117 via the bus 112. In accordance with the piece of map information data of the specified region, the display processing section 117 displays the piece of map information of the specified region (or a map of the specified region) on a display 118.

For example, when receiving from the input device 110 controlled by a user an operation input signal that orders the terminal PL to play back the pieces of music data listed in a play list, the CPU 113 reads out from the hard disk drive 115 those pieces of music data in the order of the play list specified by the user who controlled the input device 110, or downloads them from the music provision server through a network interface 119 and a communication processing section 120, and then supplies them to an audio processing section 121 via a bus 112. The audio processing section 121 therefore outputs from a speaker 122 the sound of those pieces of music data in the order of the play list.

Moreover, the CPU 113 can access the regional popular music ranking provision server 12 on the network NT through the communication processing section 120 and the network interface 119 and exchange various kinds of data with the regional popular music ranking provision server 12.

The hard disk drive 115 can store various kinds of data, which the CPU 113 reads out when needed, such as those exchanged between the server 12 and the music playback terminal PL or those used for producing the other data. Actually, the hard disk drive 115 stores the map information data, the pieces of music data, the popular music ranking table Tb and the piece of user information, some or all of which are read out when needed.

If the programs stored in the ROM 114 or the hard disk drive 115 are designed to realize the functions of the first or second embodiment's music playback terminal PL, the CPU 113 can perform the same processes as those of the first or second embodiment's music playback terminal PL, with the CPU 113 working in the same way as the control section 45, the input device 110 and the input processing section 111 working in the same way as the operation section 40, the hard disk drive 115 working in the same way as the storage section 46, the communication processing section 120 and the network interface 119 working in the same way as the communication section 41, the audio processing section 121 working in the same way as the playback section 43, the speaker 122 working in the same way as the audio output section 44, and the display processing section 117 and the display 118 working in the same way as the display section 42.

Therefore, the music playback terminal PL, whose hardware configuration is illustrated in FIG. 22, can offer the same functions and effects as those of the first and second embodiments.

In the third embodiment, the CPU 100 of the regional popular music ranking provision server 12 is designed to read out the programs from the ROM 101 or the hard disk drive 102 to perform the processes. However, the present invention is not limited to this. Alternatively, the CPU 100 may read out, by controlling a drive device (not shown), those programs from a storage medium, such as CD or DVD, to perform the processes, or those programs may be installed from the storage medium on the hard disk drive 102.

Similarly, the CPU 113 of the music playback terminal PL may read out, by controlling a drive device (not shown), the programs from a storage medium, such as CD or DVD, to perform the processes, or those programs may be installed from the storage medium on the hard disk drive 115.

(4) Other Embodiments

In the above-noted second embodiment, the music playback terminal PL transmits the acquisition request of the specified region's popular music ranking list to the regional popular music ranking provision server 12, thereby acquiring the specified region's popular music ranking list from the regional popular music ranking provision server 12. However, the present invention is not limited to this. The acquisition request transmitted to the regional popular music ranking provision server 12 may also include a predetermined condition, such that the specified region's popular music ranking list the terminal PL receives from the server 12 conform to that condition.

Figure 23:
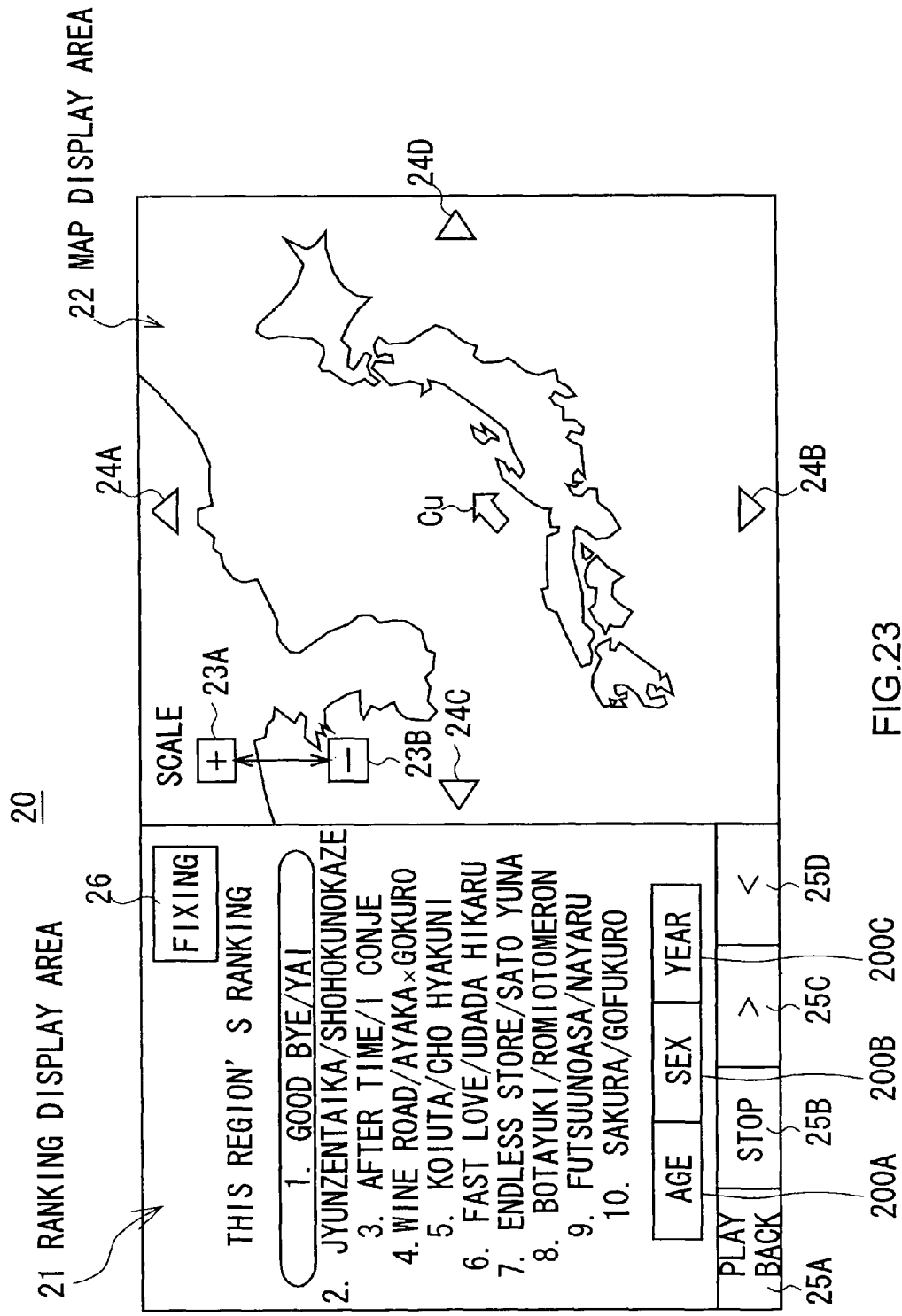
FIG. 23 is a schematic diagram illustrating the configuration of a regional popular music ranking screen according to other embodiments of the present invention (1)

In that case, for example, as shown in FIG. 23, the ranking display area 21 of the regional popular music ranking screen 20 includes setting buttons 200 to set the conditions, such as age, sex and a downloading year (which is when a piece of music data is downloaded); the setting buttons 200 include a age setting button 200A, a sex setting button 200B and a downloading year setting button 200C.

Figure 24:
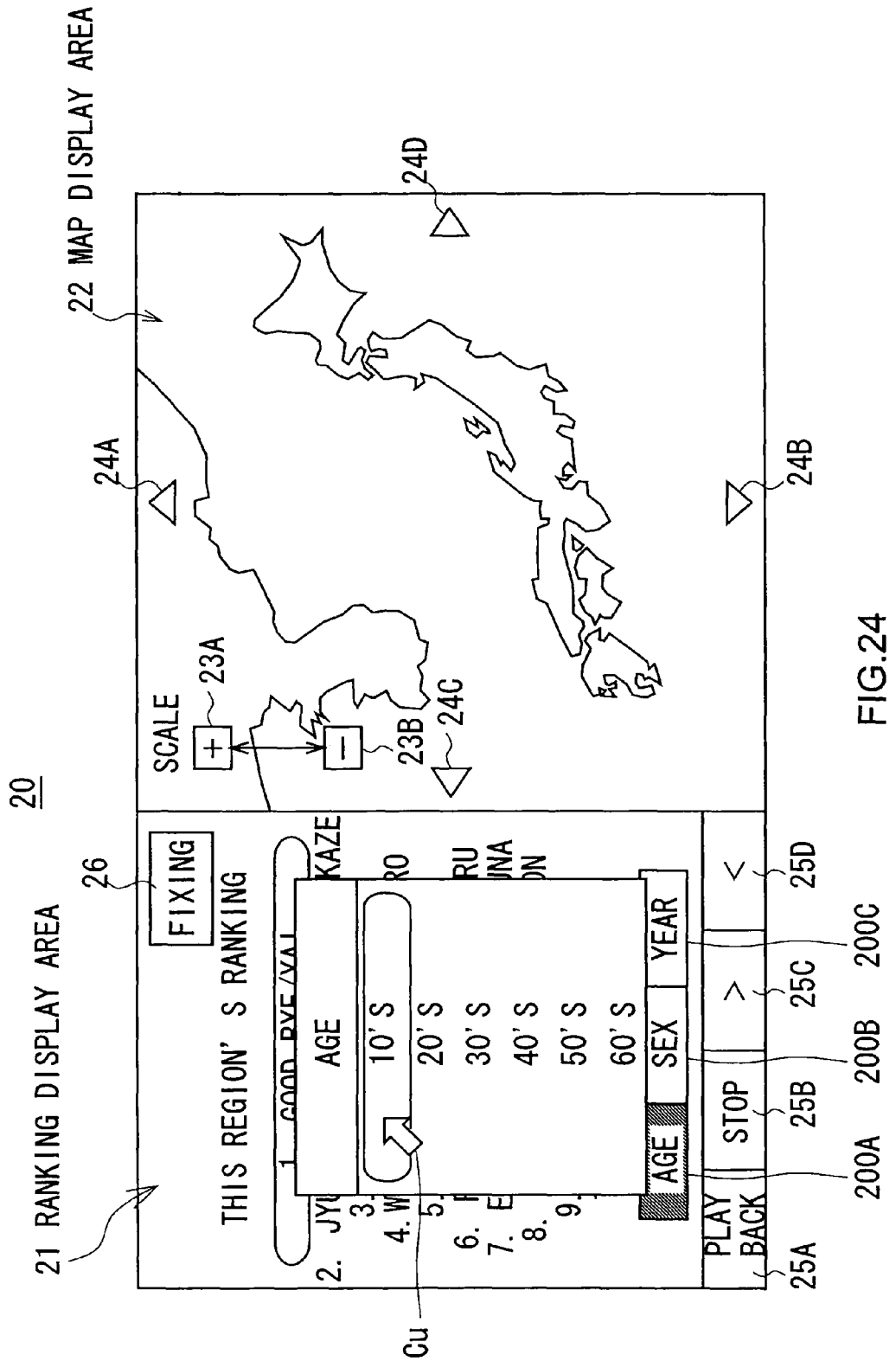
FIG. 24 is a schematic diagram illustrating the configuration of a regional popular music ranking screen according to other embodiments of the present invention (2)

When the setting buttons 200 are selected by the cursor Cu, the display control section 45B of the music playback terminal PL displays a pop-up screen 201, which for example lists: the choices of age, such as 10's, 20's and the like; the choices of sex, such as Male or Female; or the choices of downloading year, such as 2005, 2006 and the like, as shown in FIG. 24. When a predetermined condition is selected from among the choices listed in the pop-up screen 201, the ranking acquisition section 45D of the music playback terminal PL recognizes it as an acquisition condition to acquire the popular music ranking list.

If the age "10's" is selected as an acquisition condition, the ranking acquisition section 45D transmits to the regional popular music ranking provision server 12 the popular music ranking list's acquisition request with the acquisition condition of the age "10's". The regional popular music ranking provision server 12 therefore retrieves from the storage section 32 the pieces of download history information of the users whose postal addresses are within the specified region and whose ages are 10's to generate a popular music ranking list that lists the pieces of music data popular in the specified region especially among teenagers.

The ranking acquisition section 45D receives it from the regional popular music ranking provision server 12 and display it on the ranking display area 21. In this manner, the popular music ranking list that lists the pieces of music data popular in the specified region especially among teenagers is displayed on the ranking display area 21.

Similarly, the popular music ranking lists can be acquired even if other conditions, such as sex or a downloading year, are selected. Note that the time when a piece of music data is downloaded is also recorded for example in the piece of user information to enable the server 12 to recognize a downloading year of each piece of music data. In addition, the acquisition condition could be the combination of age, sex and a downloading year.

If the user information also includes user's hometown, nationality, occupation and the like, they can also be acquisition conditions.

In that manner, a more specific popular music ranking list can be displayed in line with the users' preference.

Moreover, in the above-noted first and second embodiments, all the regions displayed on the map display area 22 are regarded as specified regions (except for when a specific region is selected by the cursor Cu), and those regions' popular music ranking lists are acquired. However, the present invention is not limited to this. If there is the region whose entire area is not displayed on the map display area 22, this region may be excluded. In this case, only the region whose entire area is displayed on the map display area 22 is regarded as a specified area and the region's popular music ranking list is acquired.

Figure 25:
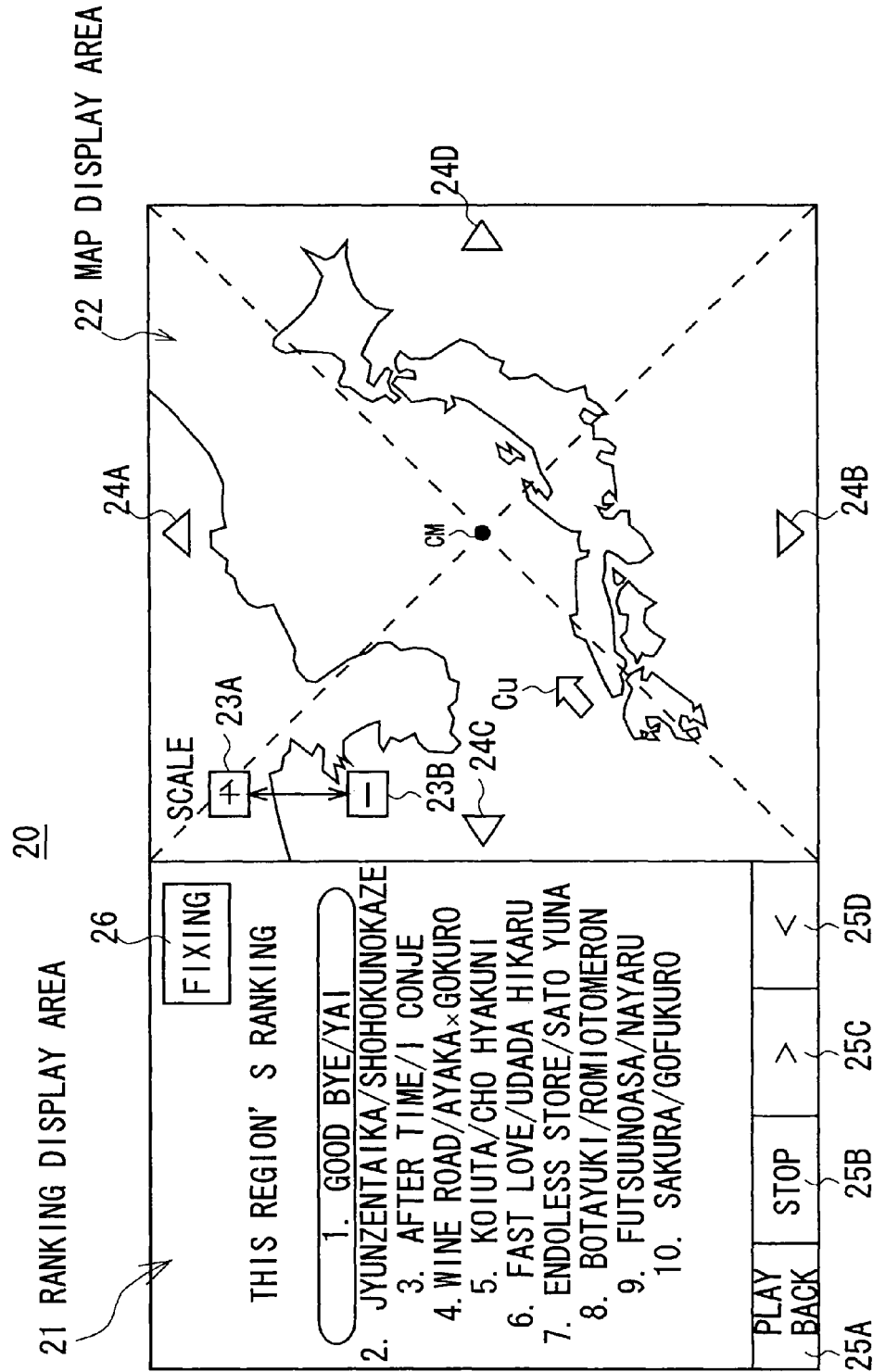
FIG. 25 is a schematic diagram illustrating the configuration of a regional popular music ranking screen according to other embodiments of the present invention (3)

As shown in FIG. 25, the map display area 22 may display a center mark CM on its center. In this case, the region under the center mark CM is regarded as a specific region and its popular music ranking list is acquired. This center mark CM allows a user to recognize which region is selected now.

If under the center mark CM is the sea, an onshore region closest to the center mark CM for example is regarded as a specified region and its popular music ranking list is acquired. Alternatively, the area of the sea under the center mark CM may be regarded as a specified region and a predetermined popular music ranking list for the sea may be acquired: This popular music ranking list may be the one registered in the popular music ranking table Tb and list the pieces of music data whose titles contain the keyword of "ocean," "port," "wave," "sea breeze" or the like.

Figure 26:
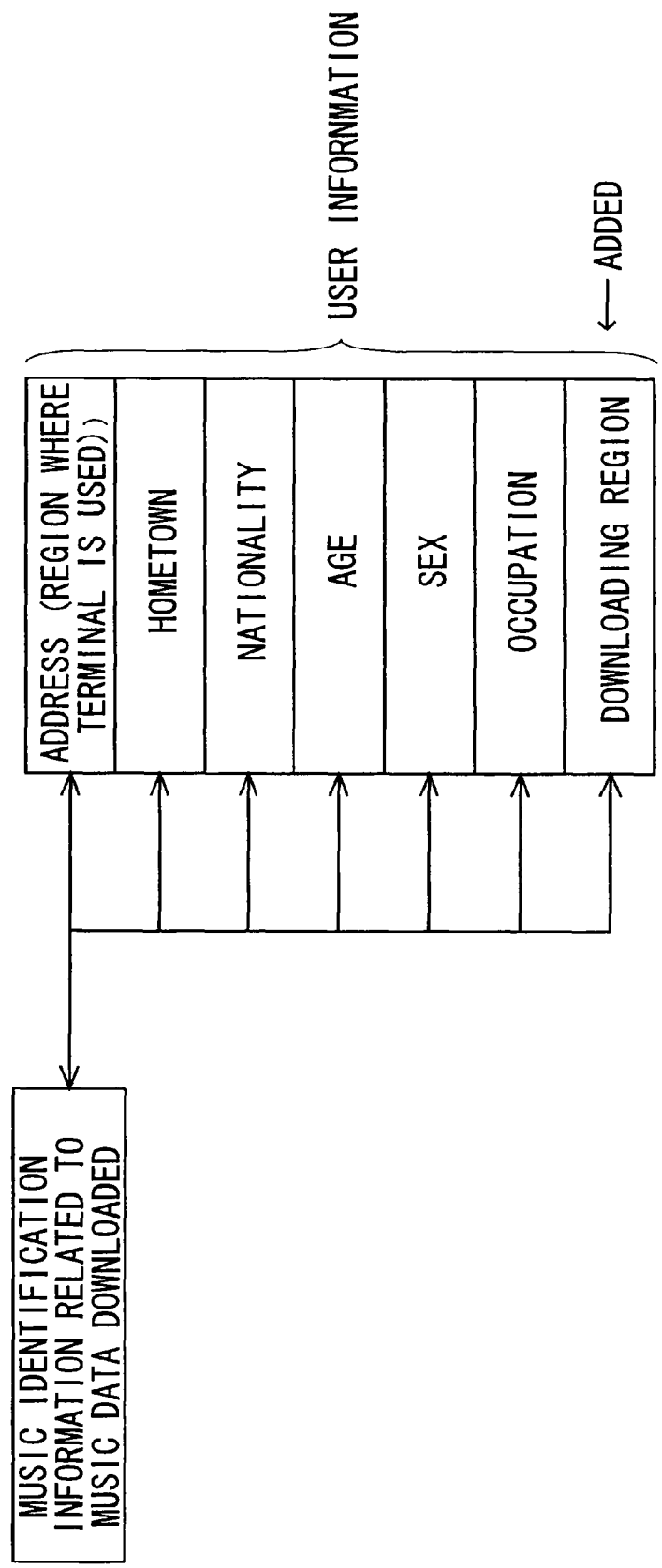
FIG. 26 is a schematic diagram illustrating the contents of a piece of download history information according to other embodiments of the present invention.

Furthermore, in the above-noted first and second embodiments, a downloading region (which is where a piece of music data is downloaded) is recognized from an address indicated in the piece of user information, which is uploaded along with the piece of music identification information as a piece of download history information. However, the present invention is not limited to this. The piece of user information may include, as shown in FIG. 26, a piece of information about a downloading region, which is determined by a Global Positioning System (GPS) module or the like (i.e. those with the function of locating a downloading region, or the current position of the music playback terminal PL) attached to the music playback terminal PL. This can locate a downloading region more accurately.

Furthermore, in the above-noted first and second embodiments, the popular music ranking list displayed on the ranking display area 21 is regarded as a play list and the pieces of music data listed in the list are played back. In this case, each piece of music data is played from beginning to end, or only part of which (the climax part of the song, for example) is played for each piece of music data. If only the part of the piece of music data (or the part of the song) is played back, where to start may be indicated in a piece of attribute information attached to the piece of music data.

Furthermore, in the above-noted first and second embodiments, when the popular music ranking list displayed on the ranking display area 21 is regarded as a play list and the pieces of music data listed in the list are played back, the music playback terminal PL downloads the pieces of music data from the music provision server 11 for streaming playback if it cannot find them in the storage section 46. However, the present invention is not limited this. If the music playback terminal PL finds the fact that the pieces of music data it will download from the server 11 are not purchased by a user yet, a link to a Web page where a user can purchase the pieces of music data may be displayed on the ranking display area 21 to urge the user to buy them.

Furthermore, in the above-noted first and second embodiments, the ranking display area 21 highlights the piece of music identification information corresponding to the currently-played piece of music data on the popular music ranking list. However, the present invention is not limited to this. By displaying a string of characters, such as "Now Playing", near the corresponding piece of music identification information, the ranking display area 21 may be able to let a user know which piece of music data is currently played back.

Furthermore, in the above-noted first and second embodiments, the music playback terminal PL regards the popular music ranking list displayed on the ranking display area 21 as a play list, plays back the pieces of music data in the order of the list, and performs a playback control process of the piece of music data in accordance with the operation of the playback operation button 25. However, the present invention is not limited to this. If one of the pieces of music identification information, which are displayed on a popular music ranking list, is selected by the cursor Cu, the piece of music data corresponding to the selected piece of music identification information may be played back immediately regardless of the order of the popular music ranking list.

Furthermore, in the above-noted first and second embodiments, the storage section 46 of the music playback terminal PL previously stores the map information data, which are used to display the pieces of map information. However, the present invention is not limited to this. The map information data may be installed in the storage section 32 of the regional popular music ranking provision server 12 and downloaded from the regional popular music ranking provision server 12 to the music playback terminal PL.

Furthermore, in the above-noted first and second embodiments, each time it downloads the piece of music data, the music playback terminal PL uploads a piece of download history information to the regional popular music ranking provision server 12. However, the present invention is not limited to this. For example, the piece of download history information may be kept for a while in the storage section 46 and then uploaded to the regional popular music ranking provision server 12 for example once a day.

Furthermore, in the above-noted first and second embodiment, the piece of music data whose number of downloading is large is regarded as a popular piece of music: the number of downloading is recognized from the pieces of download history information uploaded from the music playback terminals PL. However, the present invention is not limited to this. Popular pieces of music may be recognized from various kinds of history information: For example, based on the pieces of playback history information uploaded from the music playback terminals PL, the piece of music data whose number of playback is large may be regarded as a popular one.

Furthermore, in the above-noted first and second embodiments, the popular music ranking list of the region whose map is displayed is acquired. However, the present invention is not limited to this. Various music lists can be acquired from a predetermined provider or server that can offer those lists, as long as those lists are associated with the regions on the map: a music list of the region's artists or a music list of the songs which are sold well in the region.

The map displayed may also include a landmark, and a content list associated with the landmark may be acquired from a predetermined provider, which can offer such a list.

Furthermore, in the above-noted first and second embodiments, only the countries and their prefectures are specified as the regions, and those regions' popular music ranking lists are acquired. However, the present invention is not limited to this. In addition, the states, cities, villages and the like can be specified as the regions.

Furthermore, in the above-noted first and second embodiments, a music title and an artist name are used as a piece of music identification information. However, the present invention is not limited to this. Music IDs and the like can also be used as a piece of music identification information insofar as they can identify each piece of music data.

Furthermore, in the above-noted first and second embodiments, the U.S.A.'s popular music ranking list is regarded as the entire world's popular music ranking list. However, the present invention is not limited to this. Alternatively, the regional popular music ranking provision server 12 may generate the entire world's popular music ranking list based on all the pieces of download history information stored in the storage section 32 and then register it in the popular music ranking table Tb.

Furthermore, in the above-noted first and second embodiments, the functions of the music provision server 11 and the regional popular music ranking provision server 12 are realized by two different servers: the music provision server 11 and the regional popular music ranking provision server 12. However, the present invention is not limited to this. The functions of the music provision server 11 and the regional popular music ranking provision server 12 can be realized by one server.

Furthermore, in the above-noted first to third embodiments and the above-described other embodiments, the term "content" refers to the pieces of music data. However, the present invention is not limited to this. The content may also include other kinds of content, such as audio data, video data and programs.

If video data are also available, the regional popular music ranking screen 20 may include an area for displaying a video image of the video data in addition to the ranking display area 21 and the map display area 22, or the map display area 22 may display the video image instead of the map when the cursor CU is within the ranking display area 21 or one of the pieces of video identification information listed in a popular video ranking list is selected by the cursor Cu.

Furthermore, the functions of the music playback terminal PL can also be applied to a personal computer, an audio component, Digital Versatile Disc (DVD) recorder, a hard disk recorder, a cell phone, a portable audio player, a game machine, and other devices that can process content data.

Furthermore, the present invention is not limited to the forms of the above-noted first to third and other embodiments, but also includes a combination of some or all of the above-noted first to third and other embodiments. The present invention can be also applied to a thing extracted from the above-noted first to third and other embodiments.

The above-described method can be applied to various kinds of systems and devices that process the content data related to maps.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing server apparatus, comprising:
   circuitry configured to
   receive requests from a plurality of local terminals, the requests requesting transmission of content and including location information for each of the plurality of local terminals,
   determine physical location information for each of the plurality of local terminals based on the location information included in the requests,
   aggregate the requests for the content from the plurality of local terminals based on the physical location information corresponding to each of the plurality of local terminals, and
   provide a graphical user interface (GUI) including a first area and a second area, the first area displaying a geographical map, the second area displaying a ranking list based on a number of requests for each content received from a selected region on the geographical map,
   wherein the first area and the second area are simultaneously displayed on at least one of the plurality of local terminals, the first area and the second area do not overlap, and the second area includes a fixing button that, when actuated, maintains items displayed in the ranking list fixed when the map in the first area is changed, and
   the GUI includes a window that displays parameters for updating the ranking list, and the circuitry updates the ranking list based on a parameter selected from the window.

2. The information processing server apparatus according to claim 1, wherein each request is associated with corresponding registered user information that includes the location information.

3. The information processing server apparatus according to claim 2, wherein the corresponding registered user information includes user age and gender,
   the parameters displayed in the window include age and gender,
   the circuitry updates the ranking list based on age using the aggregated requests in a case that age is the selected parameter,
   the circuitry updates the ranking list based on gender in a case that gender is the selected parameter, and
   the circuitry transmits at least a part of the ranking list to at least one of the plurality of local terminals after updating.

4. The information processing server apparatus according to claim 1, wherein the circuitry is further configured to generate the ranking list based on the aggregated requests, and to transmit the ranking list to at least one of the plurality of local terminals.

5. The information processing server apparatus according to claim 4, wherein the circuitry generates the ranking list at predetermined intervals.

6. The information processing server apparatus according to claim 5, wherein the predetermined interval is at least one day.

7. The information processing server apparatus according to claim 1, wherein the location information included in the requests is physical location information.

8. The information processing server apparatus according to claim 1, wherein the first area is adjacent to the second area in the GUI.

9. The information processing server apparatus according to claim 1, wherein the parameters displayed in the window include a time of transmission of the contents based on the requests, and circuitry is further configured to generate the ranking list based on the time of transmission of the contents corresponding to the requests in a case that the time of transmission of the contents corresponding to the requests is the selected parameter.

10. The information processing server apparatus according to claim 1, wherein the selected region includes the entire world and the ranking list includes rankings indicative of requests received from the entire world.

11. The information processing server apparatus according to claim 1, wherein the window is displayed based on user actuation of a displayed button.

12. The information processing server apparatus according to claim 1, wherein the window overlaps at least one of the first and second areas.

13. The information processing server apparatus according to claim 1, wherein when one user-selectable geographical region is selected from two or more selectable geographical regions included on the geographical map, the displayed ranking list is updated based on a number of requests for each content corresponding to the selected user-selectable geographical region.

14. The information processing server apparatus according to claim 1, wherein the circuitry is further configured to highlight the selected region of the geographical map.

15. The information processing server apparatus according to claim 1, wherein the circuitry is further configured to display a cursor on the geographical map, the cursor being used to select the selected region of the geographical map.

16. A method for an information processing server apparatus, comprising:
   receiving, in circuitry, requests from a plurality of local terminals, the requests requesting transmission of content and including location information for each of the plurality of local terminals,
   determining, in the circuitry, physical location information for each of the plurality of local terminals based on the location information included in the requests;
   aggregating, in the circuitry, the requests for the content from the plurality of local terminals based on the physical location information corresponding to each of the plurality of local terminals; and
   providing, with the circuitry, a graphical user interface (GUI) including a first area and a second area, the first area displaying a geographical map, the second area displaying a ranking list based on a number of requests for each content received from a selected region on the geographical map,
   wherein the first area and the second area are simultaneously displayed on at least one of the plurality of local terminals, and the first area and the second area do not overlap, and the second area includes a fixing button that, when actuated, maintains items displayed in the ranking list fixed when the map in the first area is changed, and
   the GUI includes a window that displays parameters for updating the ranking list, and the ranking list is updated based on a parameter selected from the window.

17. The method according to claim 16, wherein each request is associated with corresponding registered user information that includes the location information.

18. The method according to claim 17, further comprising:
updating, at the circuitry, the ranking list based on user age and using the aggregated requests, in a case that age is the selected parameter, the user age and gender being included in the corresponding registered user information;
updating, at the circuitry, the ranking list based on the gender in a case that gender is the selected parameter; and
transmitting at least part of the ranking list to at least one of the local terminals after updating.

19. The method according to claim 16, further comprising:
generating, in the circuitry, the ranking list based on the aggregated requests; and
transmitting the ranking list from the circuitry to at least one of the plurality of local terminals.

20. The method according to claim 19, wherein the ranking list is generated at a predetermined interval.

21. The method according to claim 20, wherein the predetermined interval is at least one day.

22. A non-transitory computer-readable medium encoded with computer-readable instructions thereon, the computer readable instructions when executed by an information processing server apparatus cause the information processing server apparatus to perform a method comprising:
receiving requests from a plurality of local terminals, the requests requesting transmission of content and including location information for each of the plurality of local terminals,
determining, in the information processing server apparatus, physical location information for each of the plurality of local terminals based on the location information included in the requests;
aggregating, in the information processing server apparatus, the requests for the content from the plurality of local terminals based on the physical location information corresponding to each of the plurality of local terminals;
providing a graphical user interface (GUI) including a first area and a second area, the first area displaying a geographical map, the second area displaying a ranking list based on a number of requests for each content received from a selected region on the geographical map,
wherein the first area and the second area are simultaneously displayed on at least one of the plurality of local terminals, and the first area and the second area do not overlap, and the second area includes a fixing button that, when actuated, maintains items displayed in the ranking list fixed when the map in the first area is changed, and
the GUI includes a window that displays parameters for updating the ranking list, and the ranking list is updated based on a parameter selected from the window.

23. The non-transitory computer-readable medium according to claim 22, wherein each request is associated with corresponding registered user information that includes the location information.

24. The non-transitory computer-readable medium according to claim 23, further comprising:
updating the ranking list based on user age and using the aggregated requests, in a case that age is the selected parameter, the user age and gender being included in the corresponding registered user information;
updating the ranking list based on the gender in a case that gender is the selected parameter; and
transmitting at least part of the ranking list to at least one of the local terminals after updating.

25. The non-transitory computer-readable medium according to claim 22, further comprising:
generating the ranking list based on the aggregated requests; and
transmitting the ranking list at least one of the plurality of local terminals.

26. The non-transitory computer-readable medium according to claim 25, wherein the ranking list is generated at a predetermined interval.

* * * * *